United States Patent
Duncombe et al.

(10) Patent No.: US 7,127,477 B2
(45) Date of Patent: Oct. 24, 2006

(54) METHOD AND SYSTEM FOR ACCESS TO AUTOMATICALLY SYNCHRONIZED REMOTE FILES

(75) Inventors: Chris Duncombe, Langley (CA); Norman Jaffe, Vancouver (CA); Nicholas M. Swain, Dewittville (CA)

(73) Assignee: Everyware Solutions Inc., Aldergrove (CA)

( * ) Notice: Subject to any disclaimer, the term of this patent is extended or adjusted under 35 U.S.C. 154(b) by 364 days.

(21) Appl. No.: 10/290,085

(22) Filed: Nov. 6, 2002

(65) Prior Publication Data

US 2003/0120685 A1    Jun. 26, 2003

Related U.S. Application Data

(60) Provisional application No. 60/338,497, filed on Nov. 6, 2001.

(51) Int. Cl.
*G06F 12/00*    (2006.01)
*G06F 15/16*    (2006.01)

(52) U.S. Cl. ...................... 707/203; 709/243
(58) Field of Classification Search ................ 707/100, 707/200, 203, 10, 201, 202; 709/248
See application file for complete search history.

(56) References Cited

U.S. PATENT DOCUMENTS

| | | | |
|---|---|---|---|
| 5,633,931 A | 5/1997 | Wright | 713/161 |
| 5,950,198 A | 9/1999 | Falls et al. | 707/8 |
| 6,065,017 A | 5/2000 | Barker | 707/202 |
| 6,125,388 A * | 9/2000 | Reisman | 709/218 |
| 6,304,881 B1 | 10/2001 | Halim et al. | 707/201 |
| 6,330,568 B1 | 12/2001 | Boothby et al. | 707/201 |
| 6,405,218 B1 | 6/2002 | Boothby | 707/201 |
| 6,847,983 B1 * | 1/2005 | Somalwar et al. | 707/203 |
| 6,985,915 B1 * | 1/2006 | Somalwar et al. | 707/203 |
| 2002/0059256 A1 | 5/2002 | Halim et al. | 707/10 |
| 2002/0174180 A1 | 11/2002 | Brown et al. | 709/203 |
| 2002/0194205 A1 | 12/2002 | Brown et al. | 707/200 |
| 2004/0091114 A1 * | 5/2004 | Carter et al. | 380/259 |

FOREIGN PATENT DOCUMENTS

CA    2182791    6/1996

\* cited by examiner

*Primary Examiner*—Greta Robinson
(74) *Attorney, Agent, or Firm*—Seed IP Law Group PLLC

(57) ABSTRACT

A method and system for the simple, fast, and effective maintenance of consistent data files across a multiplicity of computer systems, which functionality is useful in collaborative work, effective backup, and disaster recovery. Consistency is maintained using secure file storage remote from any number of clients the files on which are automatically synchronized consuming minimal network bandwidth. Automated bi-directional "one-click" synchronization is implemented via a method that is neutral with respect to platform, operating system, firewall, and network configuration. The software product based on the invented method has the substantial advantage of installation, setup, and operation all without intervention by system administrators.

16 Claims, 24 Drawing Sheets

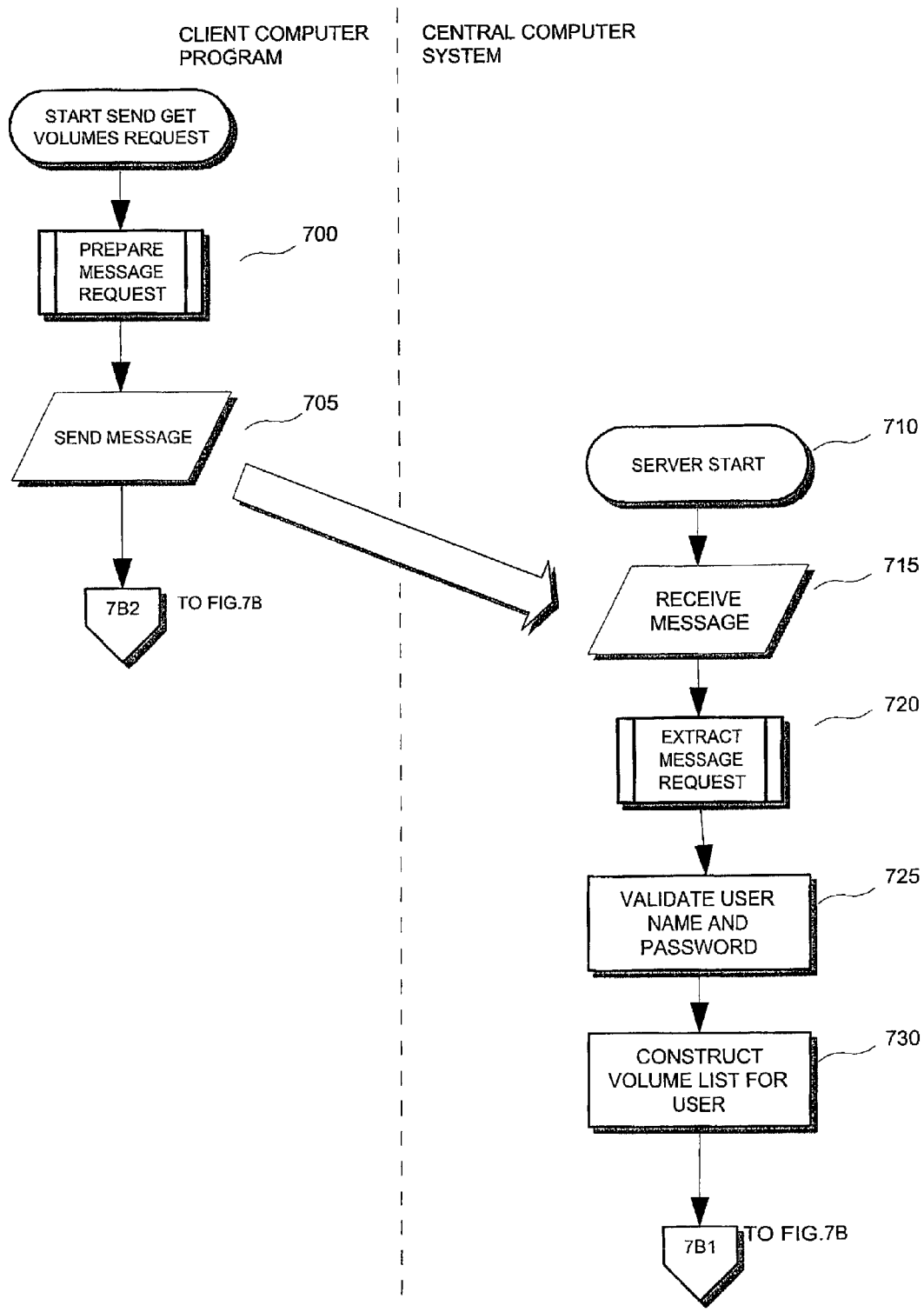

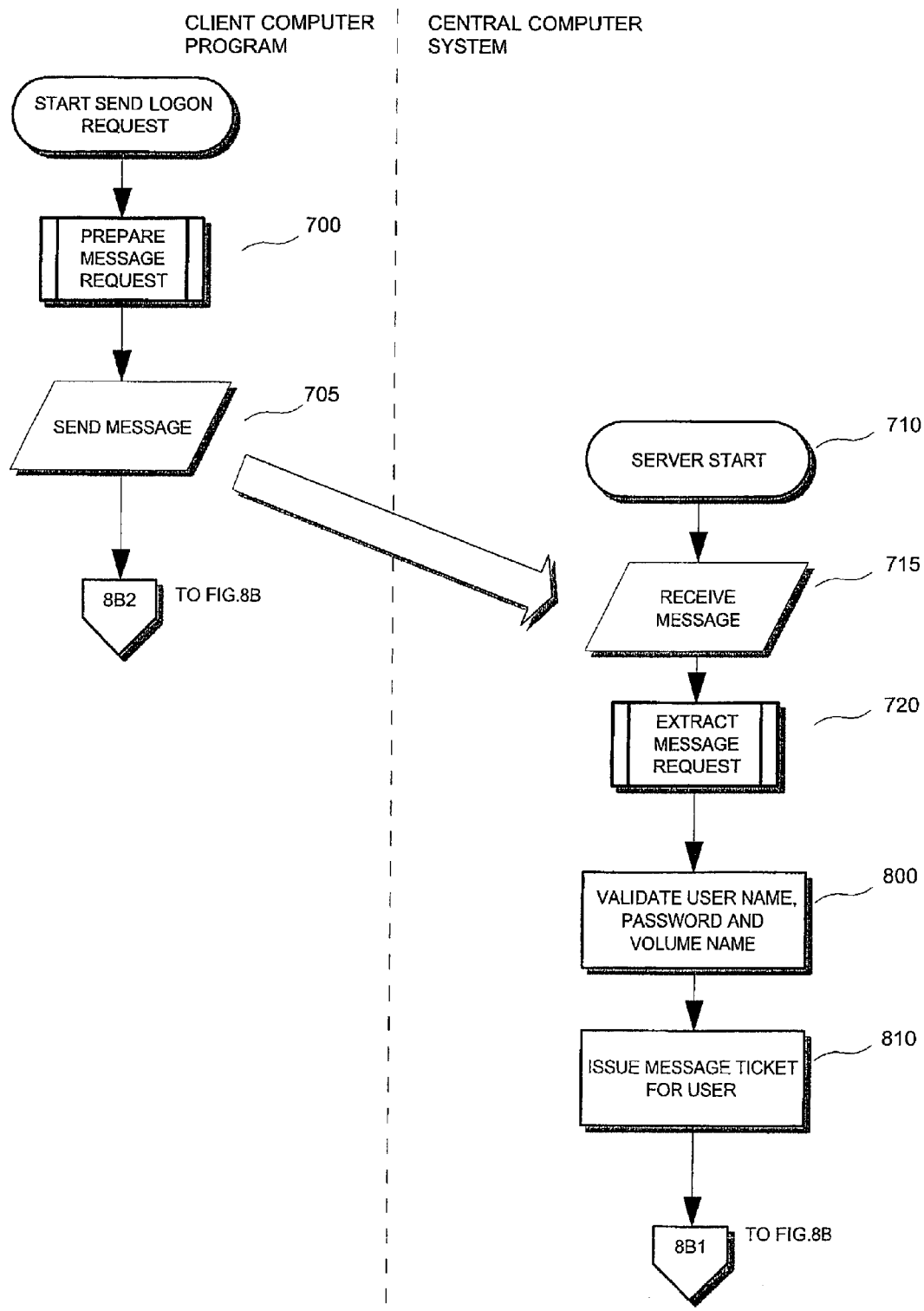

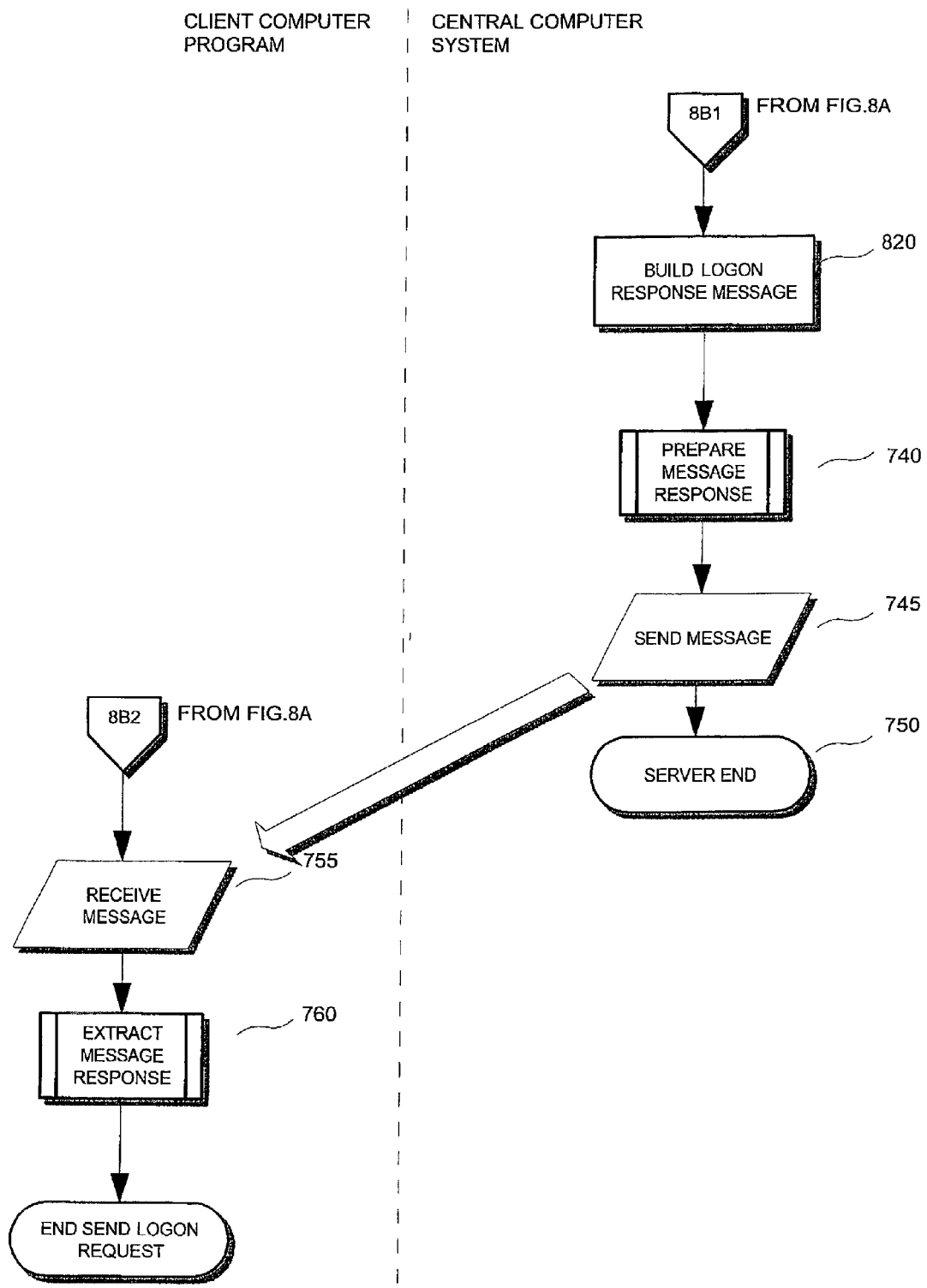

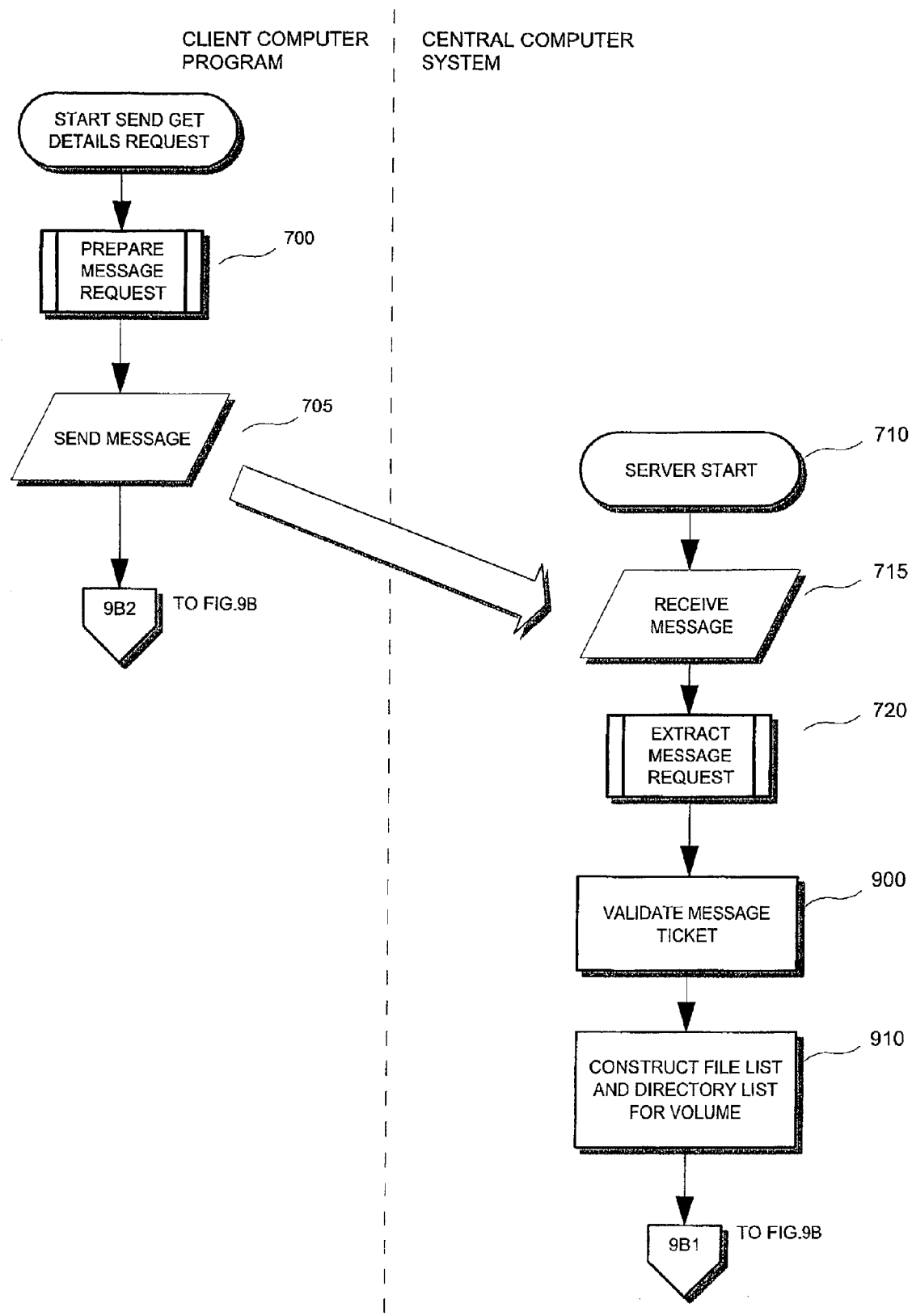

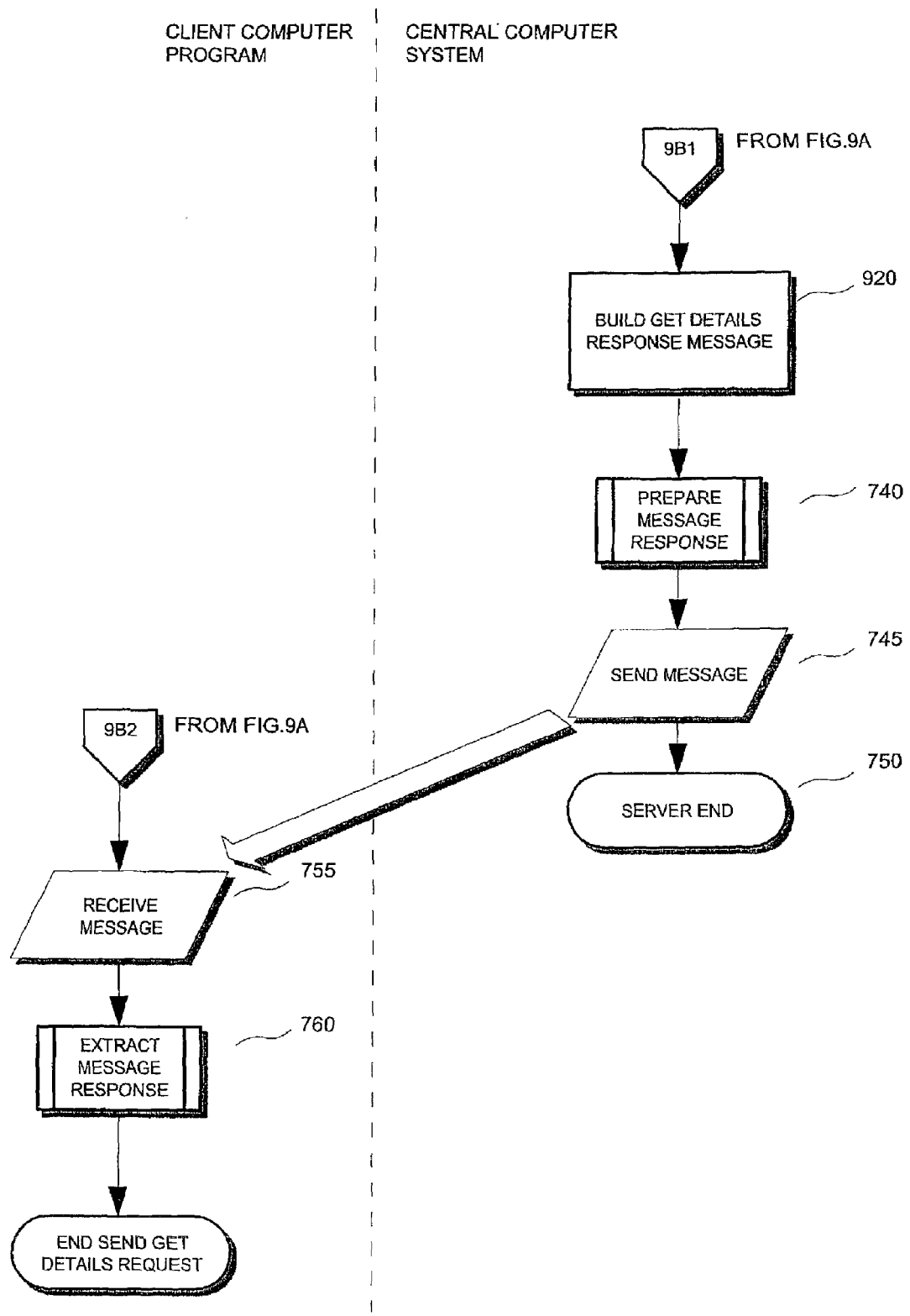

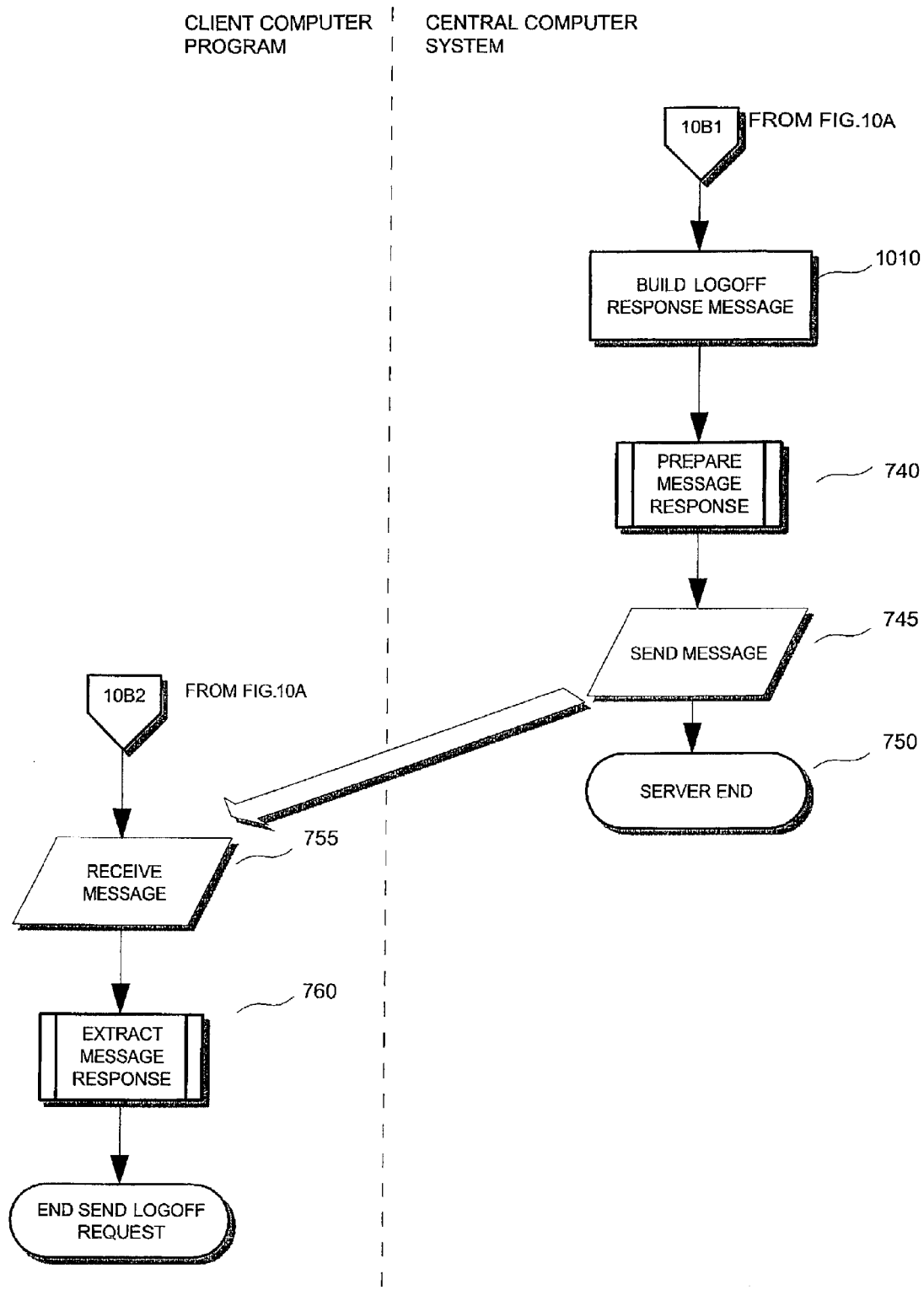

PRIOR ART FIG. 17

METHOD AND SYSTEM FOR ACCESS TO AUTOMATICALLY SYNCHRONIZED REMOTE FILES

FIELD OF THE INVENTION

The present invention relates generally to computer file storage and particularly to maintaining a consistent set of files between a plurality of computing devices.

BACKGROUND OF THE INVENTION

Most conventional means of synchronizing data between computing devices depend upon a constant, stable, network connection and often cannot reliably operate across a firewall. As portrayed in Prior Art FIG. 17 the network connection implemented in accordance with a conventional data file transfer method is maintained for the entire duration of all of the transfers (from step 1700 to step 1750), resulting in low network utilization (wasting network resources) because the time expended during human intervention in the selection of files to send from (step 1710) and receive into (step 1730) each directory is relatively large such that the actual computing device time performing the transfers (steps 1720 and 1740) is a fraction of the total time connected to the network. Such low network utilization in the context of the need to meet increasing data transfer loads in turn results in building or configuring more network resources (in the form of sockets and ports) than is strictly necessary. Disadvantageously, conventional file transfer means: cannot determine the set of files to change, send files uncompressed, and leave residual information respecting the user at the end of a session. Further, those means of file transfer that can cross firewalls require modifications to the host or client computer system to permit operation, which as a result often suffer a significant reduction in performance.

Each known file system comprises a set of identifiable rules and a method for organizing both files within a directory structure and the units of data associated with a file, which units are commonly known as bits or file segments. A file comprises a set of such bits whether or not contiguously located within a storage medium. The "path" to a file is a common and well-understood means for locating the subject file that is identifiable within the context of the subject file system. On a standalone computing device, the "path" is typically the chain or string of logical directories, associated with physical sectors of the storage medium on which the subject data is recorded, which path identifies the location of a file of related data. The operating system of the subject computing device typically associates said physical sectors with logical blocks comprised of bits that make up files and file segments. The "name" of a file identifies the specific set of bits that comprise that file. When the bits of a file are not stored contiguously, each file segment of bits normally includes bits representing characters that identify the name of the file to which those bits belong, making it possible to gather and reassemble the bits into a file for processing, transfer, or other purposes. Relative to the directory structure in which the subject files are located mirroring storage methods disadvantageously for online, but particularly so for wireless operations redundantly capture all of the bits on all paths, even where a majority of the files have not been altered since they were first written. On a network (including the InterNet) computing device, the "path" is typically longer and more complex, potentially involving: domains, groups, a user, a session, an IP address, remote networks, routers, bridges, firewalls, servers, peripheral devices, drives, directories or folders, a file name or ID, file handles, various file information (including properties, access rights, and contents), various formats, and other organizational detail. To simplify the task of individual or collaborating End Users the technique of "mapping" drives and devices places files within a more familiar and memorable context submerging the complexity of the true path.

Known conventional file transfer methods and systems are based on a manual approach (e.g. FTP or e-mail) according to which the user must determine which files need to be transferred in which directions. Some file transfer systems are proprietary and work only with particular hardware combinations and unknown levels of transport security. Such systems often have significant problems with data security and integrity, as well as suffering from poor network utilization. Disadvantageously, none of such proprietary systems are easily operable by an untrained user without changing system settings on the client machine. And, none of said systems are sufficiently robust to encourage users to store business-critical information on the server at the same time as being flexible enough to grant access from unprepared client machines such as are found in "Internet Cafés".

Known data synchronizing technology includes some methods that compare files at the level of individual records or the level of individual bits. Such methods tend to be lengthy and processor intensive or unintelligent and unable to distinguish altered files from unaltered files. Disadvantageously, some such methods also require modifications to the operating system of the client machine and a constant network connection in order to execute.

Remote data storage and recovery systems include a selection of commercially available products such as "X-Drive", which client component plugs into the Windows Explorer application as a separate drive icon, and is also available via a web browser client. Once this product is installed, the new virtual "drive" may be mapped and treated like other network drives. Disadvantageously, the user is responsible for manually moving files between the X-Drive and other drive locations, either local or remote, and takes full responsibility for determining what action to take should a file of the same "name" already exist in either of the source or destination folders. Known variants on the X-Drive model include IDrive and IBackup.

Palm Pilot's "HotSync" system comprises software (client or Handheld and host or Desktop), a cable (USB or traditional serial with multi-pin adaptors), and a cradle that are used for the synchronization of data between a Palm Pilot PDA and a host (typically a Desktop) computer. Hotsynch requires a dedicated physical connection and uses no encryption or compression during data transfer. Disadvantageously, Hotsynch does not contemplate multiple computers accessing the server simultaneously, nor the use of any network connection that implements a TCP/IP stack. Further, Hotsynch operates on individual records not on wide industry standard tree structures, directories, and files.

Pumatech's lntellisync product describes a mechanism to synchronize records from a database between two instances of a database, and Pumatech's U.S. Pat. Nos. (6,304,881, 6,330,568, 6,405,218) and application 2002/0059256-A1 are all concerned with various aspects of the synchronization of data in record form between two databases. Even ExtendedSystems product that addresses PDA synchronization beyond the functionality provided in HotSync, disadvantageously provides no means for exploring or interpreting the contents of files.

PC DOCS products allow multiple individuals to manually coordinate changes to a set of shared files using document version numbers over a dedicated network connection without compression or security making it unsuited to use on public networks.

iPod from Apple Computer can store and play MP3 sound files. iPod uses a file model for the sounds, and performs a synchronization operation between a host computer and the MP3 device, using a FireWire (IEEE 1394) interface. Disadvantageously, iPod requires a dedicated physical connection and does not contemplate multiple computers to access the server simultaneously. Further, iPod does not use encryption and compression during data transfer making it unsuited to use on public networks for the transfer of business data.

Disadvantageously, traditional FTP clients use a complex protocol (communicating via a special port) that commonly cannot traverse firewalls and that neither compresses nor encrypts data. As a consequence, traditional FTP clients expose the name and password of the user to any individual monitoring the network over which the FTP client is operating—in addition to exposing the file names, paths, and the contents of the files being transferred. Specialized variations of traditional FTP clients do exist that provide encryption, but they often require changes to the FTP server system to accommodate them, and may or may not be able to traverse firewalls.

Other known products are oriented to a private "enterprise" network environment (e.g. VPN) rather than public networks and disadvantageously do not provide secure, bi-directional, remote, and bandwidth efficient file synchronization across the InterNet.

RepliWeb, for example, specializes in peer-to-peer, many-to-one, and one-to-many file replication for production environments with large numbers of files or quantities of data. Repliweb, is used for large-scale server replication and disadvantageously does not permit remote access to data for processing. Although RepliWeb's file replication is a good (critical content high-availability and business continuity) solution for remote site data mirroring, web publishing, content loading, cascaded file distribution, and consolidation, disadvantageously, Repliweb requires that the target device be available through a previously established secure network connection, typically using an expensive VPN, further requiring knowledge of the target device(s), further consuming network services.

PowerSync from Linkpro is a real-time file replication product, for Windows NT and 2000 servers, which requires that the target device be visible as a mapped drive within the file system view, via a previously established secure network connection being either a LAN or WAN. PowerSync has no actual client-server communication protocol per se, instead the synchronization is simply done by specifying the source and target directories or folders on a target device that must be a mapped network drive visible to Windows explorer. Disadvantageously, to work remotely PowerSync requires that some form of secure VPN already be in place, which is not easy for a non-expert user to do on a unprepared client workstation such as an end user may access at an Internet Café or an airport terminal. PowerSync's security depends on network security so it appears that the data is compressed but not encrypted in any way. Although PowerSync can be configured to transfer only files that have changed, complete file transfers are made and use common network file transfer methods.

Idem from Soft Experience is similar to Peer Software's PeerSync product, being used exclusively for mirroring a specified data set to a target device, but not remotely unless the target device is a network drive previously mapped through some other mechanism and apparently oriented towards Apple's Macintosh file systems.

SureSync from Software Pursuits can replicate files to one or more servers, or to laptop and desktop computers, using LAN, WAN, VPN, TCIP/IP, or FTP connections, but lacks any secure client-server software interprocess communication.

ViceVersa from TGRMN software is a Windows utility that compares, mirrors, synchronizes and backs up data, however, ViceVersa is a LAN/WAN based product deploying a number of file comparison methods, and without a system for secure communication between software processes during synchronization.

The problem with conventional data transfer and synchronization products (whether for files or for bits) is that they are device specific, require significant configuration and typically do not or cannot: compress; automatically identify the set of changed files or bits; provide secure, remote, bidirectional, file synchronization across the Internet; while using an unprepared client workstation without the intervention of a technical operator.

SUMMARY OF THE INVENTION

The present invention, in two of its aspects, is a system for and a method that automatically identifies changes between remotely located subject files, which changes it uses to synchronize the bit content of those files, securely and bi-directionally transferring only altered files or bits in a compressed form suitable for use on an unprepared client workstation through a public network and thereafter automatically disengages the network connection upon completing the required transfers—all without the significant configuration of an unprepared client workstation from which it automatically removes data respecting both the application and the user at the end of each session, leaving no traceable user activity. The advantage of this automated, bidirectional, "one-click" synchronization is implemented through a method and system that are substantially neutral with respect to all of: platform, operating system, firewall, and network configuration—providing simple, fast access to remote files for the maintenance of consistent file content between a plurality of computing devices, which is useful in collaborative work, backup, disaster recovery, and for other purposes.

Advantageously, using secure client-server software interprocess communication facilitates the use of public networks, such as the InterNet, for said synchronization, thereby eliminating the need to setup and use expensive private networks (VPNs), which in order to communicate with unprepared client workstations (such as an end user may access at an Internet Café or an airport terminal) must be configured by a system administrator or other technical operator. Advantageously, the method and system aspects of the present invention support Unicast, Multicast and advanced third-party transports, providing end-to-end solutions for LAN, WAN, Internet, VPN, and Satellite networks. File content consistency is maintained in part by using secure file storage remote from any number of clients the file contents (any arbitrary or generic user data stored in any portion of a file system) of which are automatically synchronized consuming minimal network bandwidth due to substantial gains in transfer efficiency that are achieved by combining binary patching with the sending of only the changed files. Further, by including in system aspect of the present invention means to interpret the contents of the files to be synchronized the solution of the present invention reduces the need for human intervention in target selection and is more generally applicable to computing systems than are conventional technologies.

The present invention solves the commercially important problem with reliably and securely transporting arbitrary data between one or more host or central servers and multiple client devices—including handheld PDAs and conventional workstations, even when running different operating systems. The system of the present invention further operates efficiently over wired or wireless network connections and allows one or more client devices to transfer a set of data files or bits to and from a host device such that the set of data files or bits on the host device and the set of data files or bits on the subject client device(s) have the same content—without wastefully transferring files that were determined by comparison (e.g. a checksum comparison) to have the same contents on both devices or systems, and further to permit more than one client device to connect to the host device or system at the same time. According to the system aspect of the present invention, data transfer is performed using advanced strong encryption techniques (e.g. AES), fast compression, and minimal network connection time to reduce the impact of the synchronization process on the performance of both the client and host devices or systems. Advantageously, in order to permit traveling users substantial flexibility in accessing their files remotely, the system aspect of the present invention includes means to remove all application and user data from the client device as part of the exit mechanism leaving no residual record of the user's files or session.

In one of its aspects the present invention provides for a method of synchronizing files on a client computer with files on a server computer, wherein the client is located remote from the server and the client and server are communicative via a network, the method comprising: establishing communication between a client computer and a server computer; and for at least one file, comparing the bits of a file on the client with the bits of a corresponding file on the server; and if the client file and the server file are not the same, then determining which file has specified characteristics; and transferring at least a portion of the file with said specified characteristics to the computer not having that file. For example, if the subject characteristic related simply to how "new" the file versions being compared were, then the method of synchronizing files on a client with files on a server, wherein the client is located remote from the server and wherein the client and server are communicative via a network, would comprise: connecting the client to the server; and for at least one selected file, comparing one selected file on the client with a corresponding file on the server using a binary checksum; and if the client file is different from the corresponding file on the server, determining which file is newer; and transferring the newer file to the computer with the older file.

The system aspect of the present invention has significant cross utility on various versions of the Windows operating system (one client for Windows NT/98/95, another for Windows CE, another for Unix, and another for Linux), but without incorporating large amounts of unique code for each O/S or platform. The server software will communicate with any of these implementations of the client application. The result is the simple, fast, and effective maintenance of consistent data files across a plurality of computing devices. The disclosed invention may also be implemented across operating systems, including the Apple Macintosh OS for which embodiment a MAC emulator is used. Automated bidirectional "one-click" synchronization is implemented via a method that is neutral with respect to network configuration. Advantageously, installation, setup, and operation are all without intervention by system administrators. Completely portable operation is made possible by the foregoing combined with e-Audit trail erasure via the "Cleanup After Exit" option. The disclosed invention also solves the problems of: file age-resolution across time zones, user handling, slow and unnecessary file transfers, (low efficiency) high network utilization, complex network configuration setup, low security transfers, security threats by e-Audit trails, and more.

In order to overcome the disadvantages of the prior art the system aspect of present invention uses a strong encryption technology, a good compression algorithm, and a novel data packaging protocol. The availability of an implementation of the 'gzip' compression algorithm eliminated the need to deal with an M×N problem of determining the ideal combination of compression and encryption algorithms. Evaluation of encryption algorithms showed that the Rijndael algorithm had the best combination of predictable performance and low resource usage. The system of the present invention transfers data over any network connection (dial-up, dedicated, or wireless) without requiring modifications to any firewall software present on the central or host computer system, and without requiring modifications to the client device, apart from the (at least temporary) installation of the client computer software element.

According to one aspect of the invention, there is provided a method of synchronizing files between a client computer and a server computer, wherein said client is located remote from said server and wherein said client and said server have at least one file an instance of which is found on both, and further wherein said client and said server are communicative via a network, the method comprising: establishing communication between said client and said server; for said at least one file found on both said client and said server, comparing at least one bit of said file as found on said client with at least one bit of said file as found on said server; and if said at least one bit of the instance of said file as found on said client is not the same as said at least one bit of the instance of said file as found on said server, then determining which instance of said file has specified characteristics; and transferring the instance of said file with said specified characteristics to the computer not having that instance of said file.

According to another aspect of the invention, there is provided a method of synchronizing files between a client computer and a server computer, wherein said client is located remote from said server further wherein said client and said server have at least one file an instance of which is found on both, and further wherein said client and said server are communicative via a network, the method comprising: establishing communication between said client and said server; for said at least one file found on both said client and said server, comparing at least one bit of said file as found on said client with at least one bit of said file as found on said server; and if said at least one bit of the instance of said file as found on said client is not the same as said at least one bit of the instance of said file as found on said server, then determining which instance of said file has specified characteristics; and transferring only altered binary differences between instances of said file from the computer having the instance of said file with said specified characteristics to the computer not having that instance of said file.

According to another aspect of the invention, there is provided a method further wherein the synchronizing of files executes automatically upon a single event and said specified characteristic is that the subject instance of said file being transferred is newer in time than the instance of said file with which it was compared. And, further wherein said communication is broken between client and server upon specified events. And, further wherein said communication is automatically established and maintained only when and for as long as required, in order to exchange said messages and information and transfer said files or bits.

According to another aspect of the invention, there is provided a method further wherein the step of transmitting Get Volumes and Get Details request messages after establishing communication between said client and said server, and further thereafter flattening and encrypting said Get Volumes and Get Details request messages prior to so transmitting. And, further wherein said client computer is operated by a user, further comprising the steps of requiring said user to logon and logoff at specific points during each session synchronizing said files, and authenticating said session in order for said session to remain active when communication is broken between said client and said server. And, further wherein said client and said server each have folders and files together with lists of folder details and file details further comprising the steps of reconciling said client and server lists of folder details and file details, and, as a result of so reconciling, marking said folders and files for processing.

According to another aspect of the invention, there is provided a method further wherein a plurality of file handling operations must be completed in the course of said synchronizing, further comprising the step of executing all file handling operation at the same time as transferring the instance of said file with said specified characteristics, including consolidating and displaying the client and server lists of folder details and file details. And, further wherein all file data before and after transfer between said client computer and said server computer is respectively automatically compressed and decompressed.

According to another aspect of the invention, there is provided a method further comprising the step of determining the binary differences between said instances of files on said client computer and said server computer, and transferring only those binary differences together with any supporting data required to replicate the newer file from either said client or said server on either said server or said client not having said newer file. And, further comprising the step of double encrypting and decrypting all file data before and after file transfer respectively; said double encryption comprising first converting, by proprietary algorithm, bits of the file data stream and thereafter immediately encapsulating said stream in IP standard HTTPS, in order that the resulting secure data stream can cross a firewall without reconfiguring said firewall.

According to another aspect of the invention, there is provided a method further comprising the step of removing all client program and user data files from the client computer, and restoring said client computer to its original state.

According to another aspect of the invention, there is provided a system for the maintenance of consistent data files across a multiplicity of computer systems over a network, the system comprising: server means; a client device; means for automatically identifying changes between the bit contents of instances of data files found on both said server and said client device; means for securely and bi-directionally transferring only altered bits in a compressed form across said network; and means for automatically disengaging said network connection upon completing said transfer. And, further wherein there are means for synchronizing more than one client with more than one server.

The accompanying drawings, which are incorporated in and constitute a part of this specification, illustrate preferred embodiments of the method, system, and apparatus according to the invention and, together with the description, serve to explain the principles of the invention.

BRIEF DESCRIPTION OF THE DRAWINGS

The present invention is described, by way of non-limiting example only, in order to be easily understood and practiced, with reference to the accompanying 19 drawings, in which:

FIGS. 7A and 7B are a detailed flowchart of the sequence of steps involved in sending a Send Get Volumes request message from the client computer program to the host.

FIGS. 8A and 8B are a detailed flowchart of the sequence of steps involved in sending a Send Logon request message from the client computer program to the host.

FIGS. 9A and 9B are a detailed flowchart of the sequence of steps involved in sending a Send Get Details request message from the client computer program to the host.

FIGS. 10A and 10B are a detailed flowchart of the sequence of steps involved in sending a Send Logoff message from the client computer program to the host.

DETAILED DESCRIPTION OF THE PREFERRED EMBODIMENT

Figure 1:
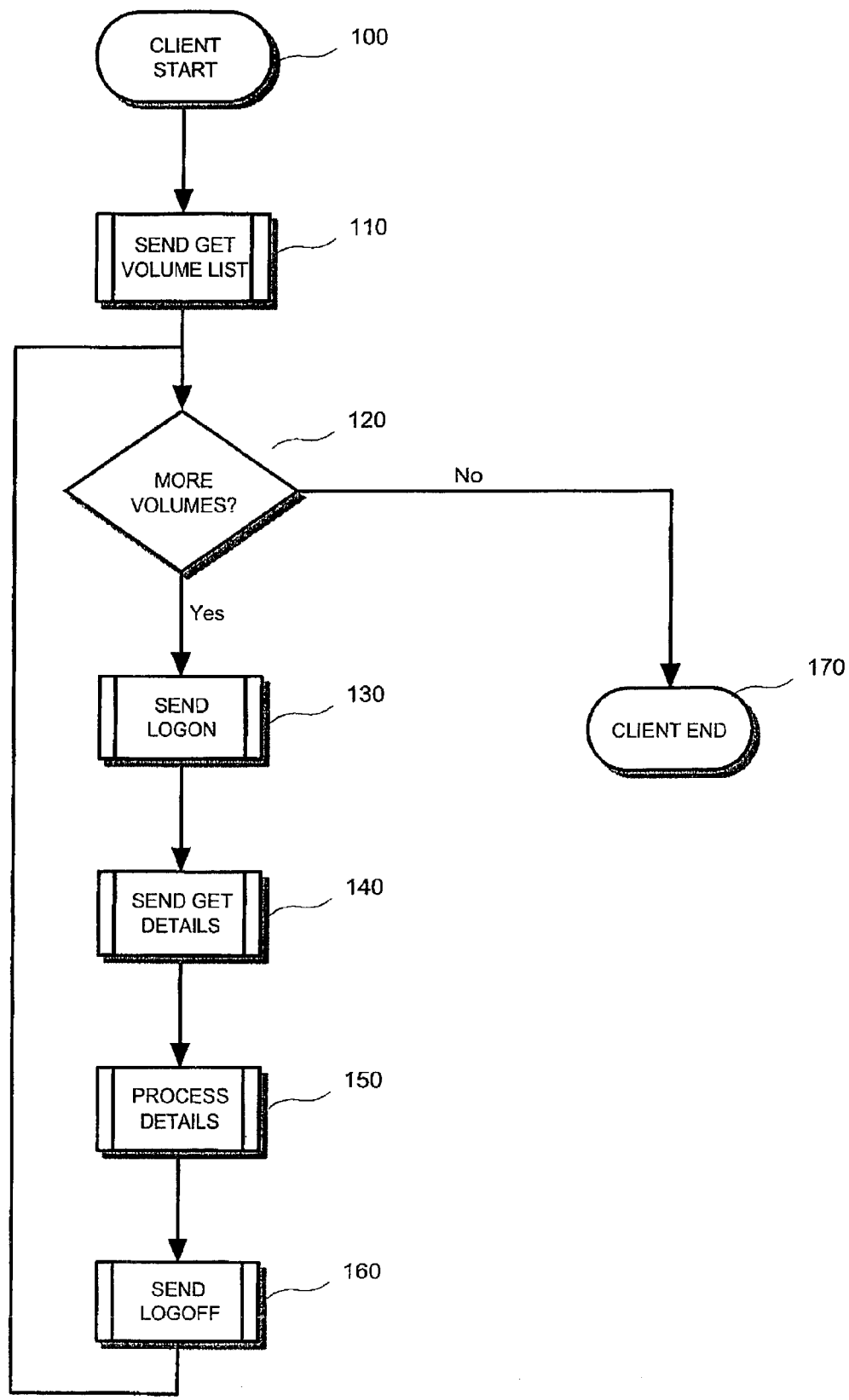
FIG. 1 is a flowchart of the sequence of steps in the synchronization operation.

According to each embodiment of the present invention as described with reference being had to FIGS. 1–19, in which identical reference numbers identify similar components, it is to be understood that the steps and means for file synchronizing transfers based on checksum comparisons may be achieved by using either: simple checksums that compare entire instances or versions of the subject file on different servers—or by more advanced checksums that by identifying the binary differences between targets effectively compare only portions or bits of the subject file to determine which portions or bits of the (e.g. more recent version of the) subject file have changed, then transferring only the altered or different bits between computing devices according to the desired outcome (e.g. update or restore). However, in executing advanced checksum comparisons, the subject files may be organized for analysis into various fixed-size segments or portions such that where the subject file is smaller than the selected segment size, then the entire subject file will be transferred as it would have been according to a simple checksum configuration.

It is further to be understood that the bi-directional Auto Synchronization or "One-click" Synchronization element of the present invention comprises the steps:

generate a list of directories and files on the host that correspond to the client program's directories, wherein each directory is assigned a number, and each file and directory has the number of its parent directory temporarily recorded;

reconcile the list of directories in the client program by adding directories not found on the host and create directories not found in the client computer program). Assign directory numbers for the new directories from the host;

reconcile the list of directories on the host (create directories found in the client computer program);

identify files in the client computer program that aren't present on the host and transmit them to the host;

identify files on the host that aren't present in the client computer program and mark them as being "remote";

for each file that isn't remote, determine if the file in the client computer program (the "local" file) is different than the file on the host (the "remote" file);

for each file that is different, if the "local" file is newer than the "remote" file, transmit it to the host; if the "local" file is older than the "remote" file, transmit it from the host; and if desired, the user can override the decisions of the synchronization logic, to fetch a file from the host, to place a file on the host, or to remove a file from the host, since a file is copied from the host only if the same file already exists in the client computer program or the user directly requests the transfer.

It is further to be understood that the Automatic Age-Resolution (wherein the host provides the reference for resolving the relative ages of files on the host and client devices) element of the present invention comprises the steps:

the host refers to all file times (creation and modification timestamps) in terms of coordinated universal time (UTC), also known as Greenwich mean time (GMT);

upon connection from the client computer program, the host provides its current time, in UTC;

each file in the list of files sent from the host to the client computer program has its creation and modification times converted to UTC, if they are not already so;

the client computer program calculates its time offset (or "delta"), from the client local time to the host's current time;

all file timestamp comparisons in the client computer program are adjusted by the value "delta", to bring the relative times into alignment. A small hysteresis factor is applied to allow for elapsed time between the initial connection to the host and the reception of the message from the host that contains its current time; and any files written by the client computer program have their creation and/or modification times adjusted by the value "delta" so that subsequent synchronizations will not consider the files to differ between the client computer program and the host. Since the calculation of the "delta" value is determined at the time of connection to the host and the connection itself is relatively brief, there is no need for recalculating the value during the connection—automatically adjusting for time zone differences between the client computer program and the host.

It is further to be understood that the Auto Disconnect maintains session authentication (Single Sign-On), wherein the host tracks each connection process through records in memory and in an external database. When a user initiates the client computer program, the user is prompted for a user name, password, and the address of the host. These values are retained for use during the initial logon to the host (and may be recorded by the client computer program for subsequent execution of the program). Communication with the host does not occur until the user requests a synchronization operation. Each communication between the client computer program and the host consists of a pair of messages—a request from the client computer program and the corresponding response from the host. For each communication, a port is requested on the client computer program and on the host, using the conventional TCP/IP socket model. This port is immediately released upon completion of the communication. In order to avoid repetitive logons, and to permit connection by multiple client computer programs, the initial communication from the client computer program to the host results in the issuance of a "ticket" on the host that corresponds to the synchronization request from the client computer system. This "ticket" is part of the wrapper data for each message from the client computer program to the host, an integral part of each communication and is recorded by the host and used to validate each subsequent communication. The "ticket" may also be used to detect when a client computer program is no longer active, by recognizing that the "ticket" has not been used for a specifiable period of time. The "ticket" validation logic also protects against "spoofing" wherein a foreign computer program is pretending to be an authorized client computer program in order to penetrate the secure communications link. Note that no "cookies" are used to record the "ticket" and all information regarding the communications is internal to the client computer program or the host.

It is further to be understood respecting Firewall Transparency, wherein the host operates as though it were a web-server, responding to HTML requests using the HTTP or HTTPS protocols—that this permits the host to be visible across firewalls, since firewalls will permit HTML requests to properly formatted Internet addresses to pass through without interference or modification. According to a preferred embodiment, in order to protect the nature and content of the communications between the client computer program and the host, each message is encrypted via a robust means, one example of which is the Rijndael encryption algorithm. Each data file transferred is also compressed by an efficient means, one example of which is the "gzip" algorithm prior to encryption. Consequently, the only data that is exposed during transfer is the "ticket" as described above, together with the message size and a "sentinel" value that validates the other exposed data. However, even the unencrypted data is mathematically altered in order to disguise its nature. Further, the initial connection message from the client computer program to the host is encrypted using proprietary means different from those used for the subsequent messages. All transfers except the initial connection mechanism use an encryption key that is determined by the user name and password that were established by the user of the client computer program. At no time are the user name or password transferred unencrypted. A person of skill in the art would understand that by using the HTTPS protocol, a further level of security can be applied to such communications.

It is further to be understood respecting the e-Audit Trail erasure or "Cleanup After Exit", feature that in order to protect the confidentiality of the data owned by the user of the client computer program, while permitting the operation of the program in a non-secure environment, all user and program data are removed on exit—by deleting the full directory tree in the client computer program for each volume known to the client computer program, as well as deleting the executable code from the directory in which it was placed. Further, in Windows, any registry entries that were established during the communication are removed. Once exit is complete, the device on which the client computer program was executed will be returned to the state that it was in immediately prior to executing the client computer program.

According to one embodiment of the invention and referring to FIG. 1 the user of the client computer program initiates a synchronization operation 100 (through a command-line option, an interpreted request or a menu item). This results in the transmission of a Send Get Volumes request message 110 to the host.

Figure 2:
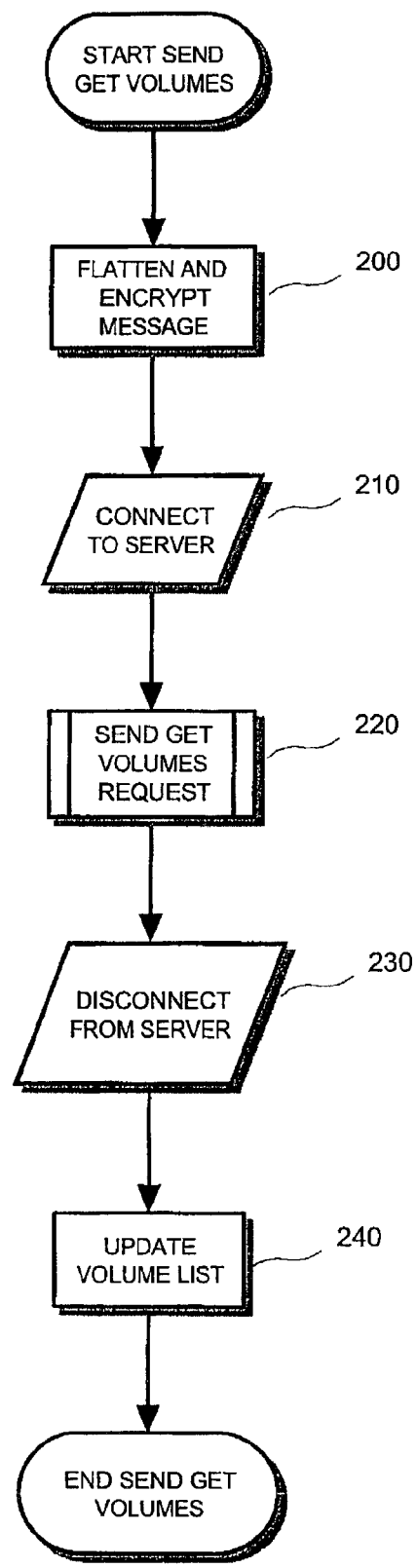
FIG. 2 is a detailed flowchart of the sequence of steps involved in the acquisition of the list of volumes.

According to one embodiment of the invention and referring to FIG. 2 the Send Get Volumes request message 110 is flattened and encrypted 200 and then a connection is established 210 with the host. The encrypted request message is conveyed 220 to the host, and a response message is received from the host. The connection is then released 230 on the client computer system. The list of volumes obtained 220 from the host is then used to update 240 the client computer system's list of volumes. The transfer of the Send Get Volumes request message and the reception of the corresponding response message is portrayed in FIG. 7. And, in FIG. 1 the completion of the processing of the Send Get Volumes request message 110 is followed by the selection 120 of the next volume to be analyzed, if one exists, or the completion of processing 170 if there are no more volumes. If there is another volume to be processed, a Send Logon request message 130 is transmitted to the host.

Figure 3:
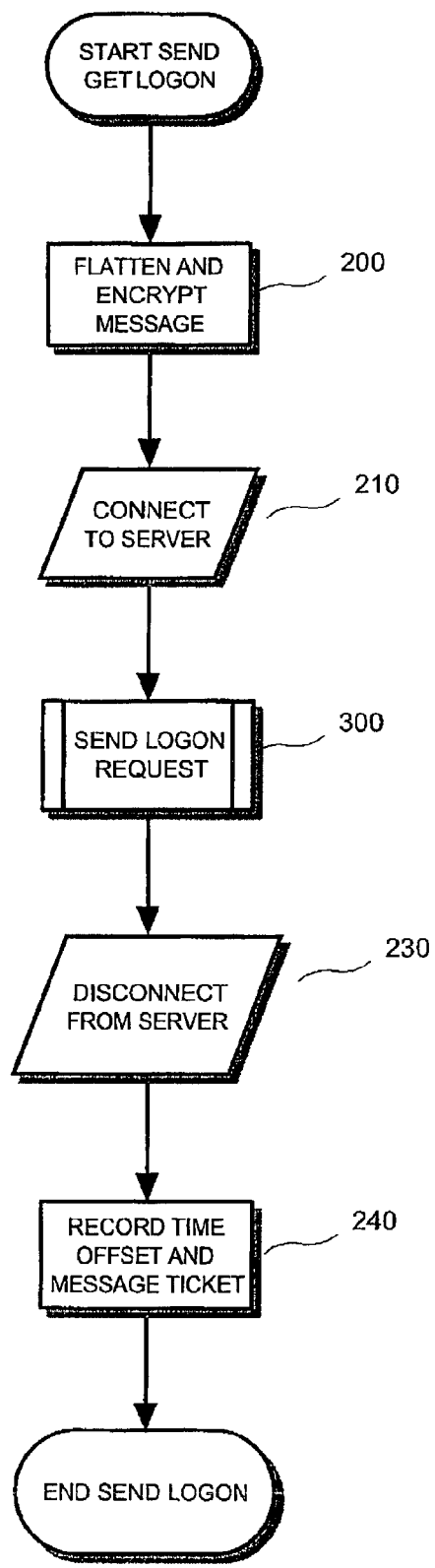
FIG. 3 is a detailed flowchart of the sequence of steps involved in the logon process.

According to one embodiment of the invention and referring to FIG. 3 the Send Logon request message is flattened and encrypted 200 and then a connection is established 210 with the host. The encrypted request message is conveyed 300 to the host and a response message is received from the host. The connection is then released 230 on the client computer system. The status information obtained 300 from the host is used to calculate the time differential between the client computer system and the host 310. The host's "ticket" (used to validate the remaining transmissions) is recorded as well and the encryption algorithm is switched to a more secure model for the remaining transmissions. The transfer of the Send Logon request message and the reception of the corresponding response message is portrayed in FIG. 8.

And, in FIG. 1, the completion of processing of the Send Logon request message 130 is followed by the transmission of a Send Get Details request message 140.

Figure 4A:
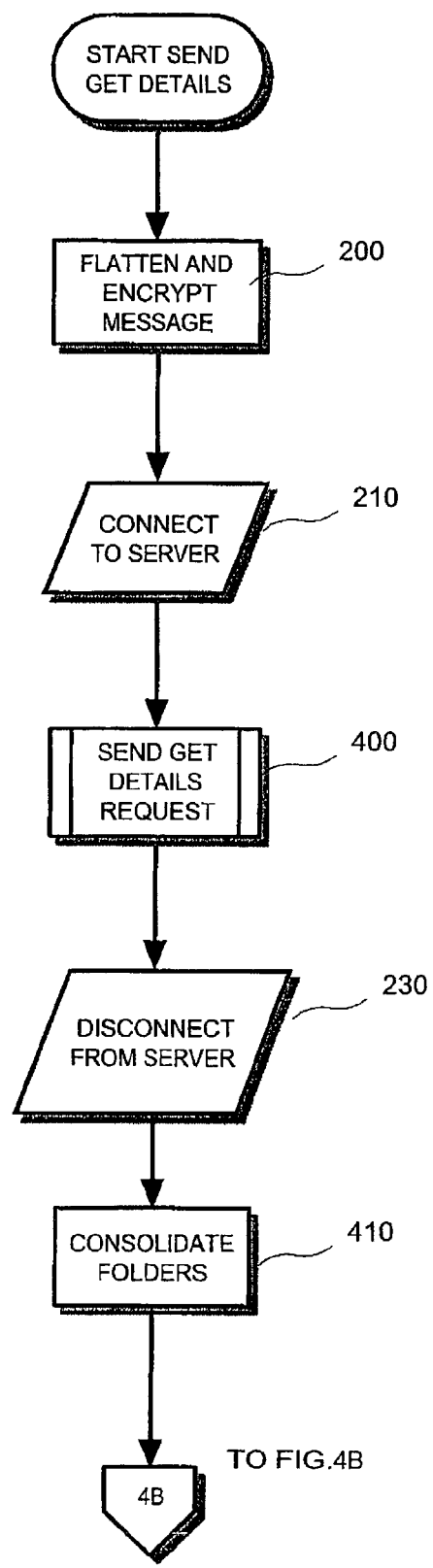
FIGS. 4A and 4B are a detailed flowchart of the sequence of steps involved in the acquisition of the list of data files and folders.
Figure 4B:
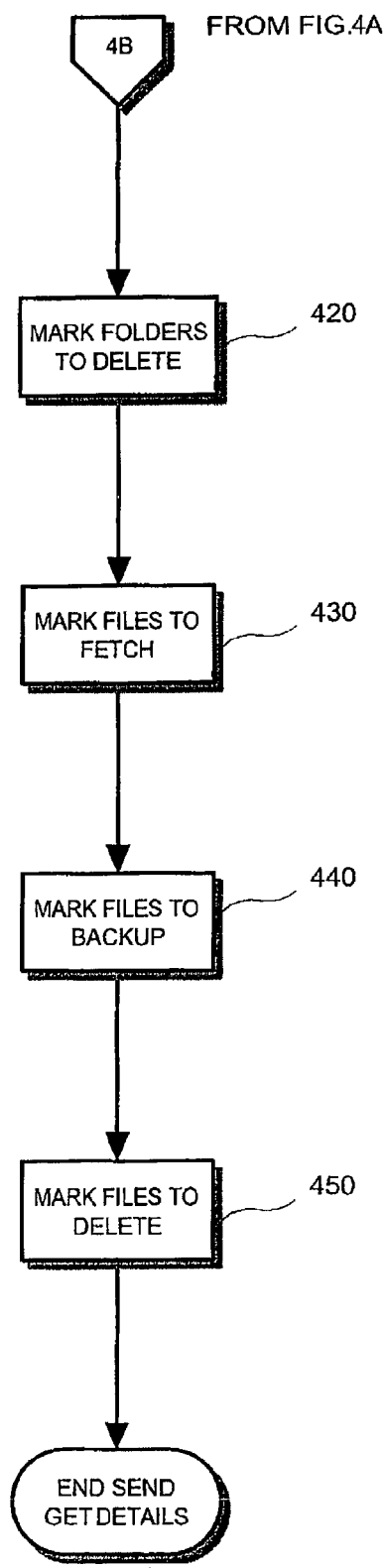

According to one embodiment of the invention and referring to FIGS. 4A and 4B the Send Get Details request message is flattened and encrypted 200 and then a connection is established 210 with the host. The encrypted request message is conveyed 400 to the host and a response message is received from the host. The connection is then released 230 on the client computer system. The list of folders and files obtained 400 from the host is reconciled with the list of folders and files available on the client computer system 410 using the path information stored with the list of folders and files to create a consolidated list of folders and files. For each folder on the client computer system that has been marked for deletion, the corresponding folder in the consolidated list of folders and files is marked for deletion 420 on the client computer system and the host. For each file in the consolidated list of folders and files, a determination is made 430 if it is a candidate for fetching from the host, based on the timestamps of the file on the client computer system and the host, as well as on other attributes of the file and the contents of the file. For each file in the consolidated list of folders and files, a determination is made 440 if it is a candidate for backing up to the host, based on the timestamps of the file on the client computer system and the host, as well as on other attributes of the file and the contents of the file. For each file on the client computer system that has been marked for deletion, the corresponding file in the consolidated list of folders and files is marked for deletion 450 on the client computer system and the host. The transfer of the Send Get Details request message and the reception of the corresponding response message is portrayed in FIG. 9. And, in FIG. 1 the completion of processing of the Send Get Details request message 140 is followed by the data transfer process 150.

Figure 5:
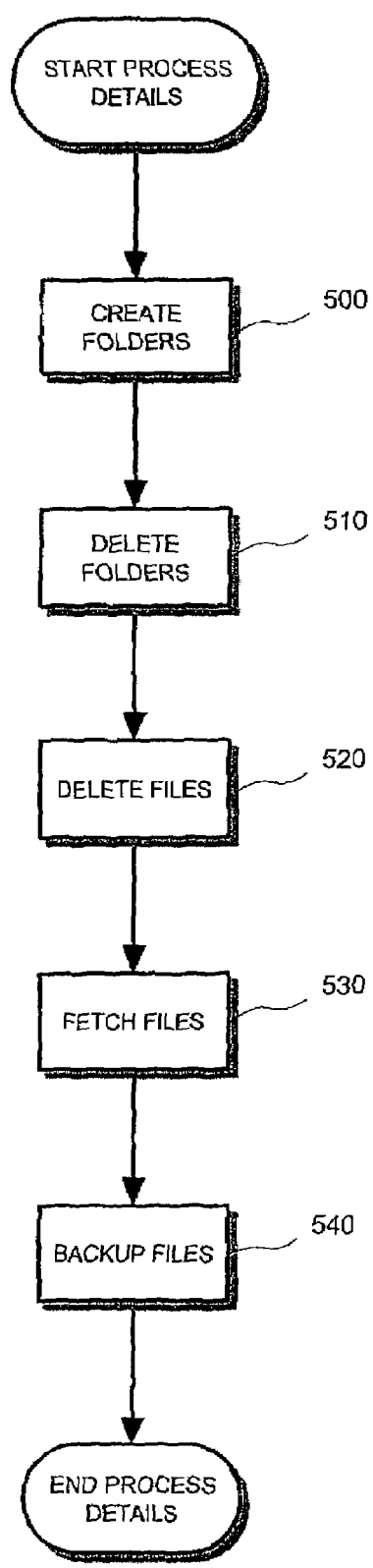
FIG. 5 is a detailed flowchart of the sequence of steps involved in the data transfer process.

According to one embodiment of the invention and referring to FIG. 5 for each folder in the consolidated list of folders and files that is present on the host and not present on the client computer system, a new folder is created on the client computer system 500. Each folder in the consolidated list of folders and files that was marked for deletion 420 is now deleted 510 from the client computer system and the host. Each file in the consolidated list of folders and files that was marked for deletion 450 is now deleted 520 from the client computer system and the host. Each file in the consolidated list of folders and files that was determined to be a candidate for fetching 430 is now fetched 530 from the host. Each file in the consolidated list of folders and files that was determined to be a candidate for backing up to the host 440 is now backed up 540 to the host. And, in FIG. 1, the completion of the data transfer process 150 is followed by the transmission of a Send Logoff request message 160.

Figure 6:
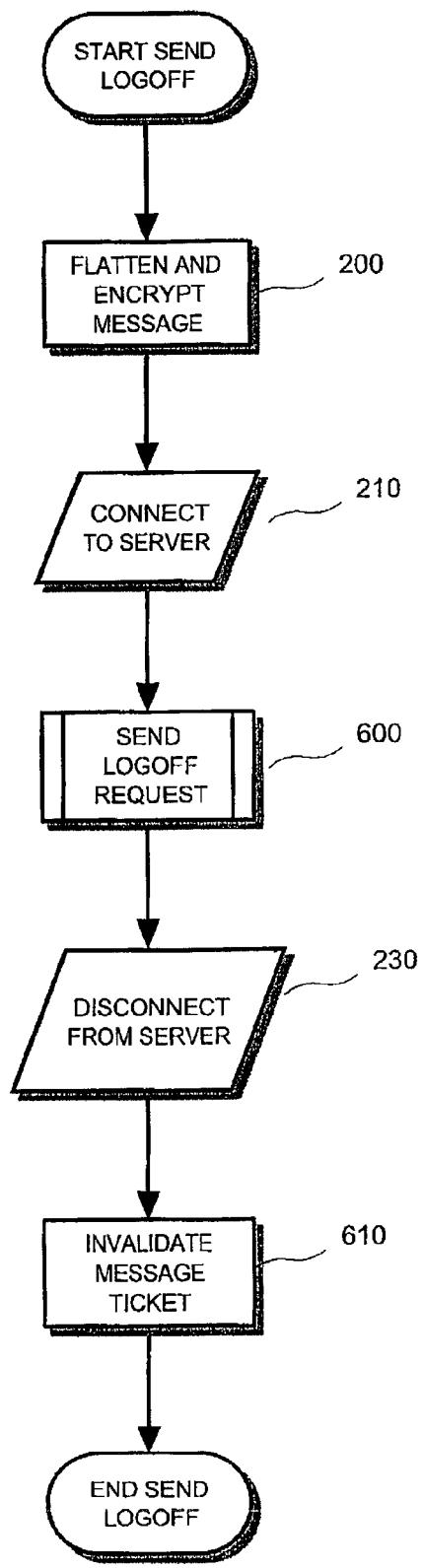
FIG. 6 is a detailed flowchart of the sequence of steps involved in the logoff process.

According to one embodiment of the invention and referring to FIG. 6 the Send Logoff request message 160 is flattened and encrypted 200 and then a connection is established 210 with the host. The encrypted request message is conveyed 600 to the host and a response message is received from the host. The connection is then released 230 on the client computer system. The central computer's "ticket" is now invalidated 610. The transfer of the Send Logoff request message and the reception of the corresponding response message is portrayed in FIG. 10. And, in FIG. 1 the completion of processing of the Send Logoff message 160 is followed by the selection 120 of the next directory.

Figure 7B:
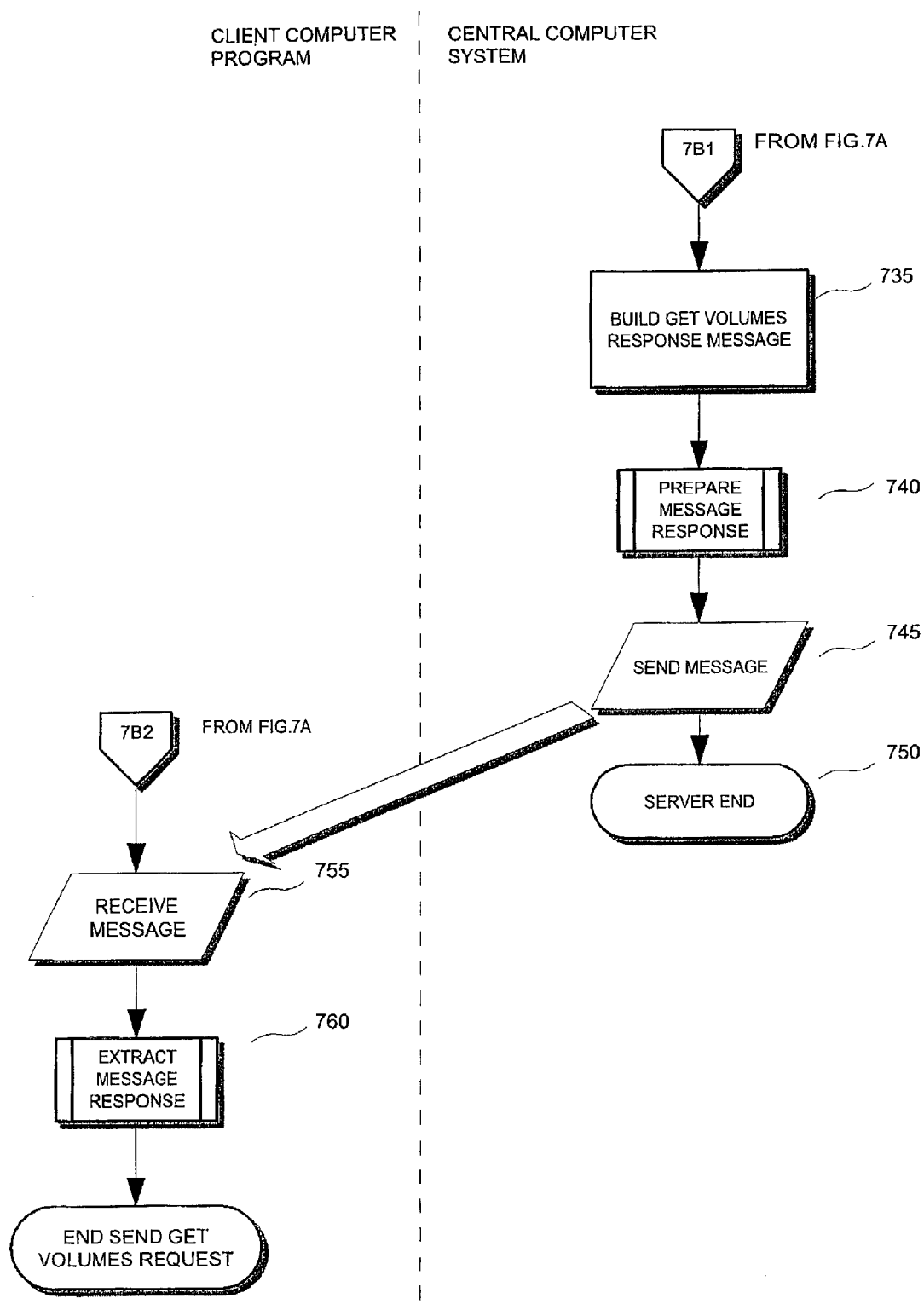

According to one embodiment of the invention and referring to FIGS. 7A and 7B the Send Get Volumes request message is prepared for transmission 700 and transmitted 705 to the host. The host detects the incoming message 710 and receives the request message 715. The original request message is extracted 720, the user name and password are validated against an external resource (such as a database) 725 and the list of volumes available to the user is prepared 730. The Get Volumes response message is created 735, prepared for transmission 740 and transmitted 745 to the client computer program. The client computer program receives the response message 755 and extracts the original response message 760. The host then closes the physical path to the client computer program 750. The request message preparation is portrayed in FIG. 11, the request message transfer is portrayed in FIG. 12, the response message preparation is portrayed in FIG. 13 and the response message transfer is portrayed in FIG. 14.

According to one embodiment of the invention and referring to FIGS. 8A and 8B the Send Logon request message is prepared for transmission 700 and transmitted 705 to the host. The host detects the incoming message 710 and receives the request message 715. The original request message is extracted 720, the user name, password and volume name are validated against an external resource (such as a database) 800 and a message 'ticket' is issued for the combination of user name and volume and session 810. The Logon response message is created 820, prepared for transmission 740 and transmitted 745 to the client computer program. The client computer program receives the response message 755 and extracts the original response message 760. The host then closes the physical path to the client computer program 750. The request message preparation is portrayed in FIG. 11, the request message transfer is portrayed in FIG. 12, the response message preparation is portrayed in FIG. 13 and the response message transfer is portrayed in FIG. 14.

According to one embodiment of the invention and referring to FIGS. 9A and 9B the Send Get Details request message is prepared for transmission 700 and transmitted 705 to the host. The host detects the incoming message 710 and receives the request message 715. The original request message is extracted 720, the message 'ticket' is validated 900 and a list of files and directories for the requested volume is prepared 810. The Get Details response message is created 920, prepared for transmission 740 and transmitted 745 to the client computer program. The client computer program receives the response message 755 and extracts the original response message 760. The host then closes the physical path to the client computer program 750. The request message preparation is portrayed in FIG. 11, the request message transfer is portrayed in FIG. 12, the response message preparation is portrayed in FIG. 13 and the response message transfer is portrayed in FIG. 14.

Figure 10A:
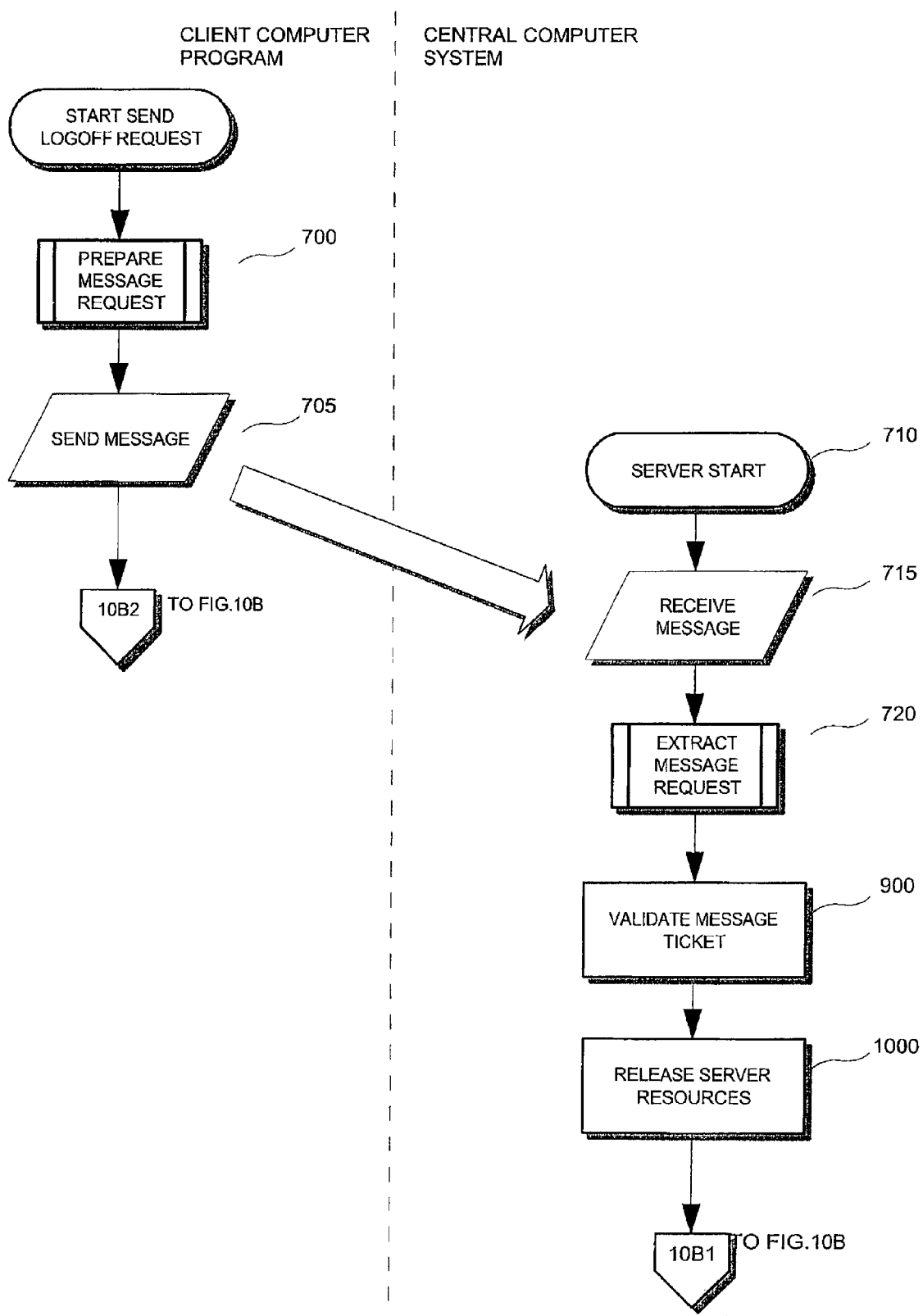

According to one embodiment of the invention and referring to FIGS. 10A and 10B the Send Logoff request message is prepared for transmission 700 and transmitted 705 to the host. The host detects the incoming message 710 and receives the request message 715. The original request message is extracted 720, the message 'ticket' is validated 900 and the resources used by the server corresponding to the message 'ticket' are released 1000. The Logoff response message is created 1010, prepared for transmission 740 and transmitted 745 to the client computer program. The client computer program receives the response message 755 and extracts the original response message 760. The host then closes the physical path to the client computer program 750. The request message preparation is portrayed in FIG. 11, the request message transfer is portrayed in FIG. 12, the response message preparation is portrayed in FIG. 13 and the response message transfer is portrayed in FIG. 14.

Figure 11:
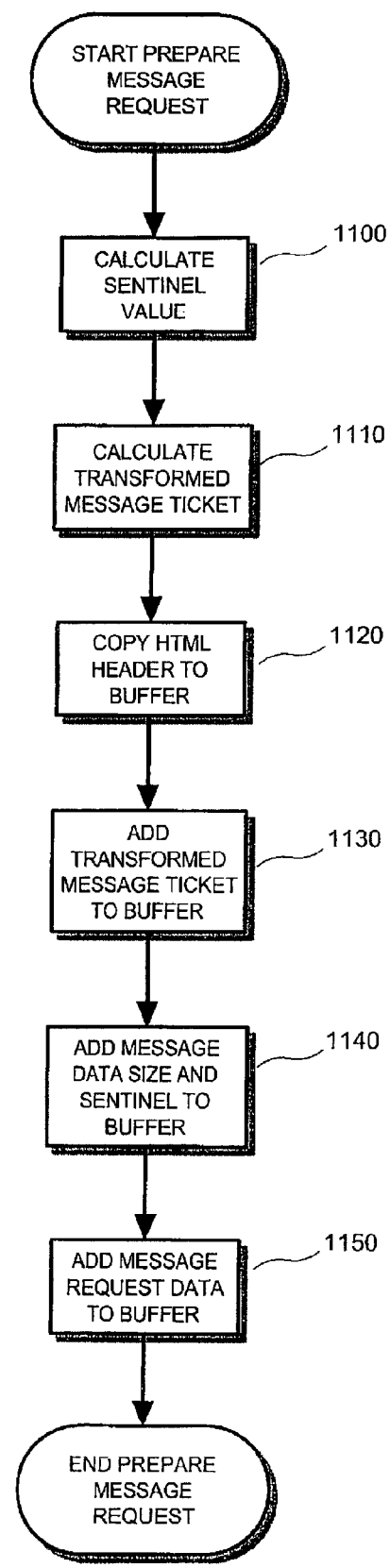
FIG. 11 is a detailed flowchart of the sequence of steps involved in preparing a request message for transfer from the client computer program and the host.

According to one embodiment of the invention and referring to FIG. 11 a request message is prepared for transfer by performing a series of steps. A sentinel value is calculated from the message size 1100 and a copy of the message 'ticket' is transformed in preparation for constructing the outgoing request message 1110. A standard HTML header is placed into a new buffer 1120, the transformed message ticket is appended 1130 and the request message size and sentinel value are added 1140. As the last step, the previously encrypted data of the request message is then added to the end of the buffer.

Figure 12:
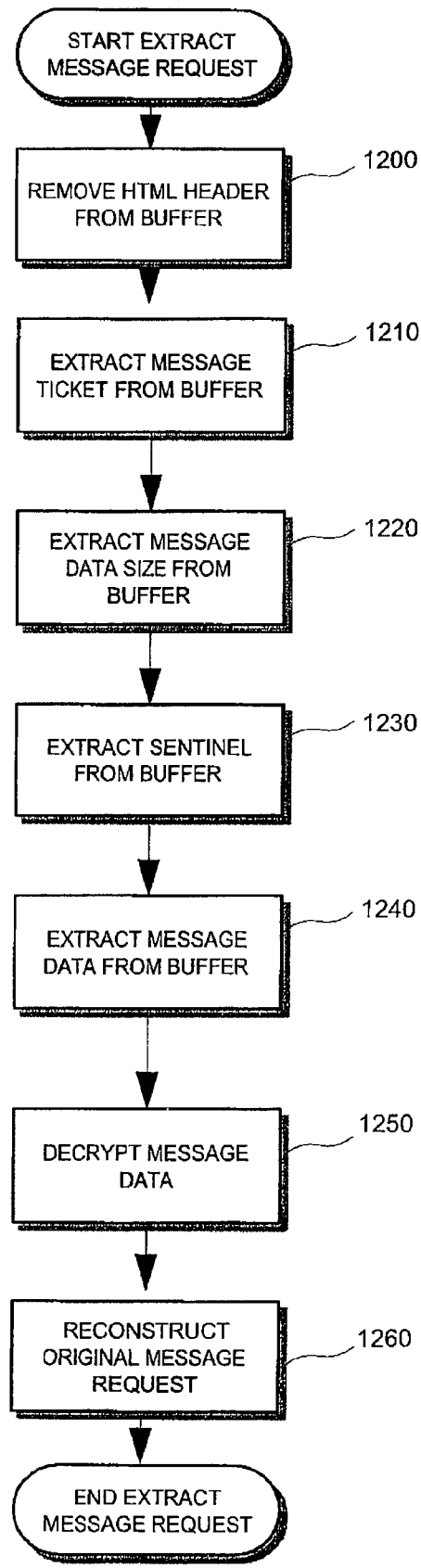
FIG. 12 is a detailed flowchart of the sequence of steps involved in the host receiving a request message from the client computer program.

According to one embodiment of the invention and referring to FIG. 12 a request message is obtained from the client computer system by performing a series of steps. The standard HTML header is removed from the message buffer 1200, and then the message 'ticket' 1210, request message data size 1220 and sentinel 1230 are extracted. The sentinel is used to validate the request message data size and the message 'ticket' identifies the transaction in progress. Once the transaction has been identified and the sentinel confirms the request message data size, the encrypted request message is obtained from the remainder of the buffer 1240. The encrypted request message is then decrypted 1250 and the original message request structure is constructed 1260 based on the transferred data as the last step.

Figure 13:
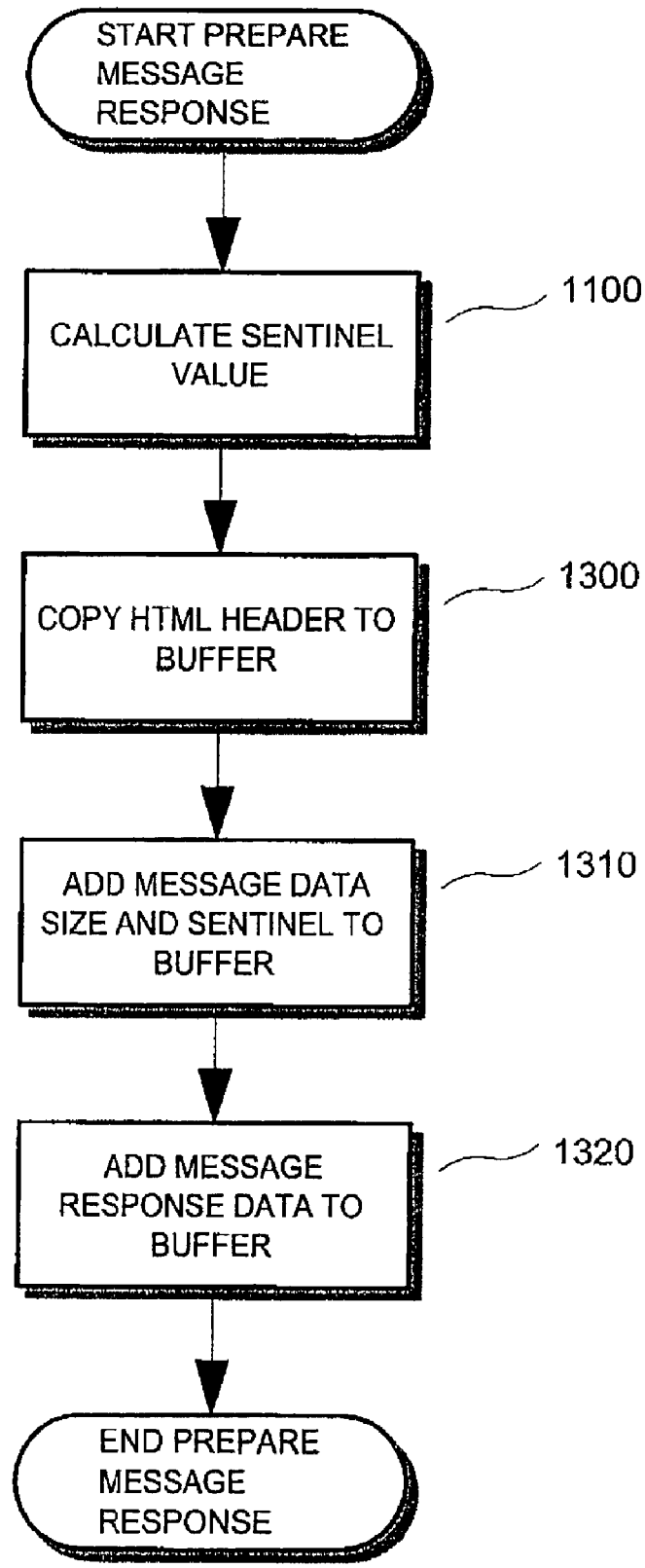
FIG. 13 is a detailed flowchart of the sequence of steps involved in preparing a response message for transfer from the host to the client computer program.

According to one embodiment of the invention and referring to FIG. 13 a response message is prepared for transfer by performing a series of steps. A sentinel value is calculated from the message size 1100, a standard HTML header is placed into a new buffer 1300 and the response message size and sentinel are added 1310. As the last step, the previously encrypted data of the response message is then added to the end of the buffer.

Figure 14:
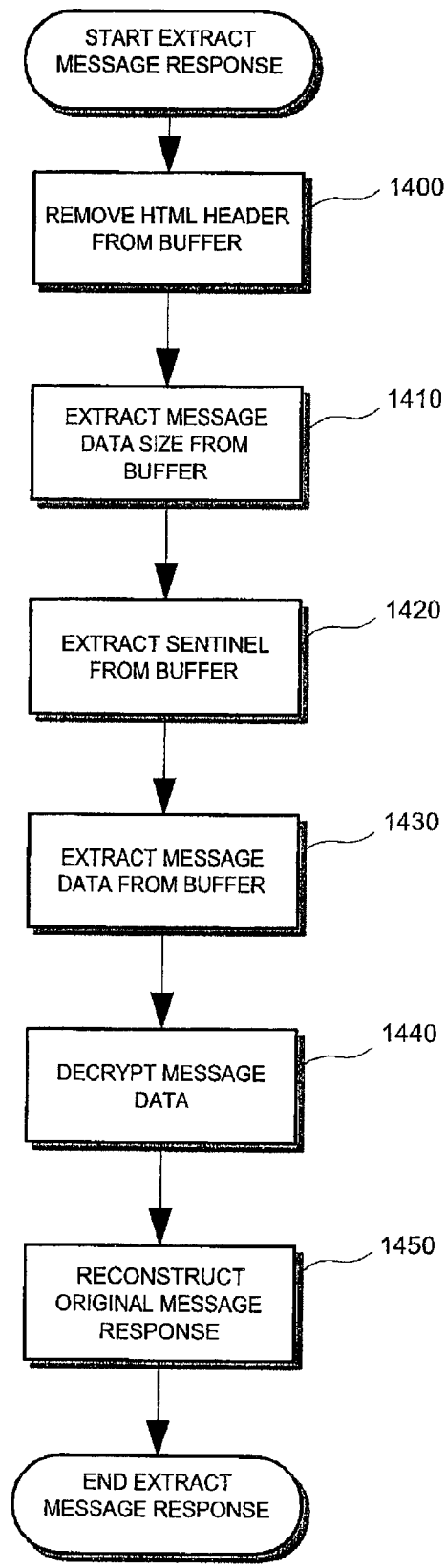
FIG. 14 is a detailed flowchart of the sequence of steps involved in the client computer program receiving a response message from the host.

According to one embodiment of the invention and referring to FIG. 14 a response message is obtained from the host by performing a series of steps. The standard HTML header is removed from the message buffer 1400, and then the response message data size 1410 and sentinel 1420 are extracted. The sentinel is used to validate the response message data size. Once the sentinel confirms the response message data size, the encrypted response message is obtained from the remainder of the buffer 1430. The encrypted response message is then decrypted 1440 and the original message response structure is constructed 1450 based on the transferred data as the last step.

Figure 15:
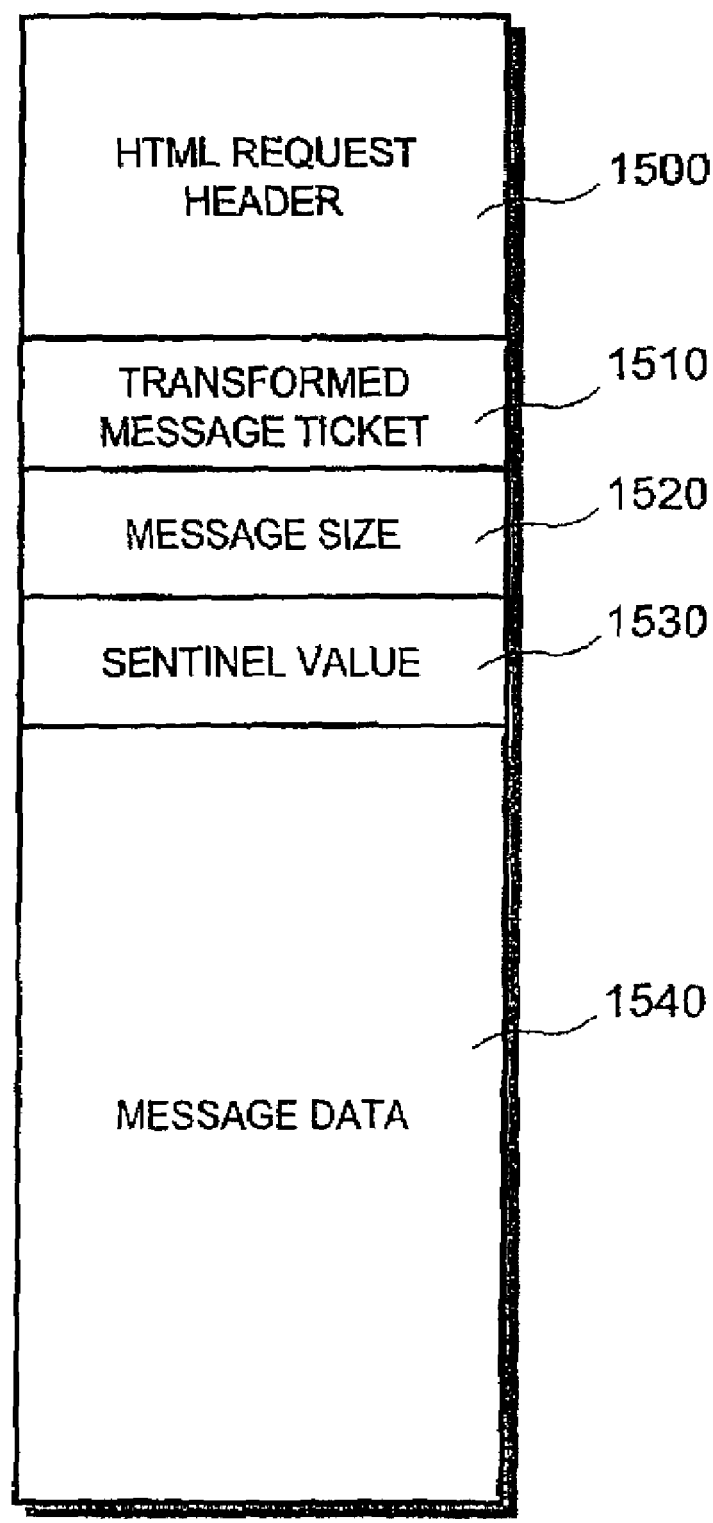
FIG. 15 and FIG. 16 comprise diagrams of the structure of messages transferred between the client computer program and the host.

According to one embodiment of the invention and referring to FIG. 15 the message transferred from the client computer program to the host is composed of a conventional HTML POST request header 1500, followed by the transformed message ticket 1510, the message size 1520, the message sentinel 1530 and the message data 1540. The transformed message ticket 1510 is a value passed to the host that identifies the transaction that this message belongs with. It is transformed by a mathematical process to disguise it's nature. The message sentinel 1530 is the result of a mathematical operation on the message size 1520 that is used to validate the contents of the message.

Figure 16:
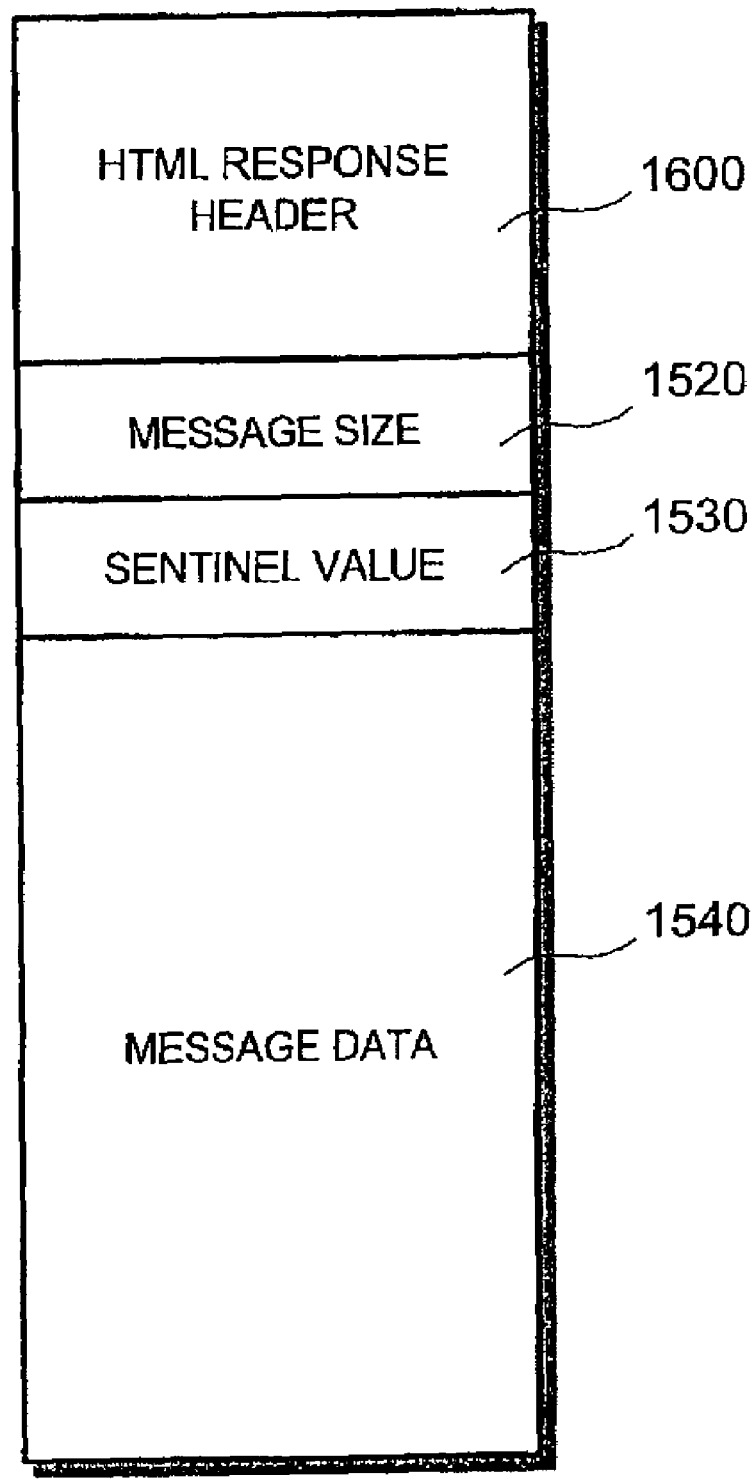
Figure 17:
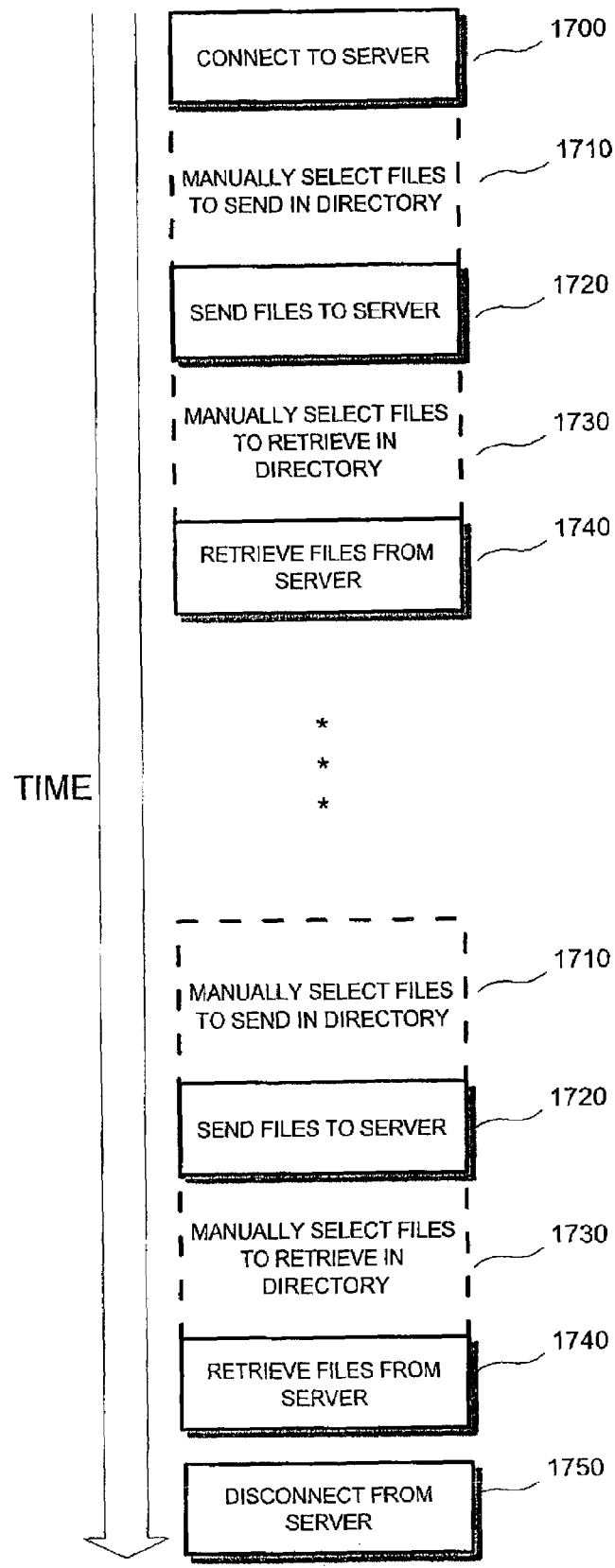
FIG. 17 is a representation of a processing timeline for the data transfer mechanism as realized in prior art.

According to one embodiment of the invention and referring to FIG. 16 the message transferred from the host is composed of a conventional HTML response header 1600, followed by the message size 1520, the message sentinel 1530 and the message data 1540. The message sentinel 530 is as described earlier.

Figure 18:
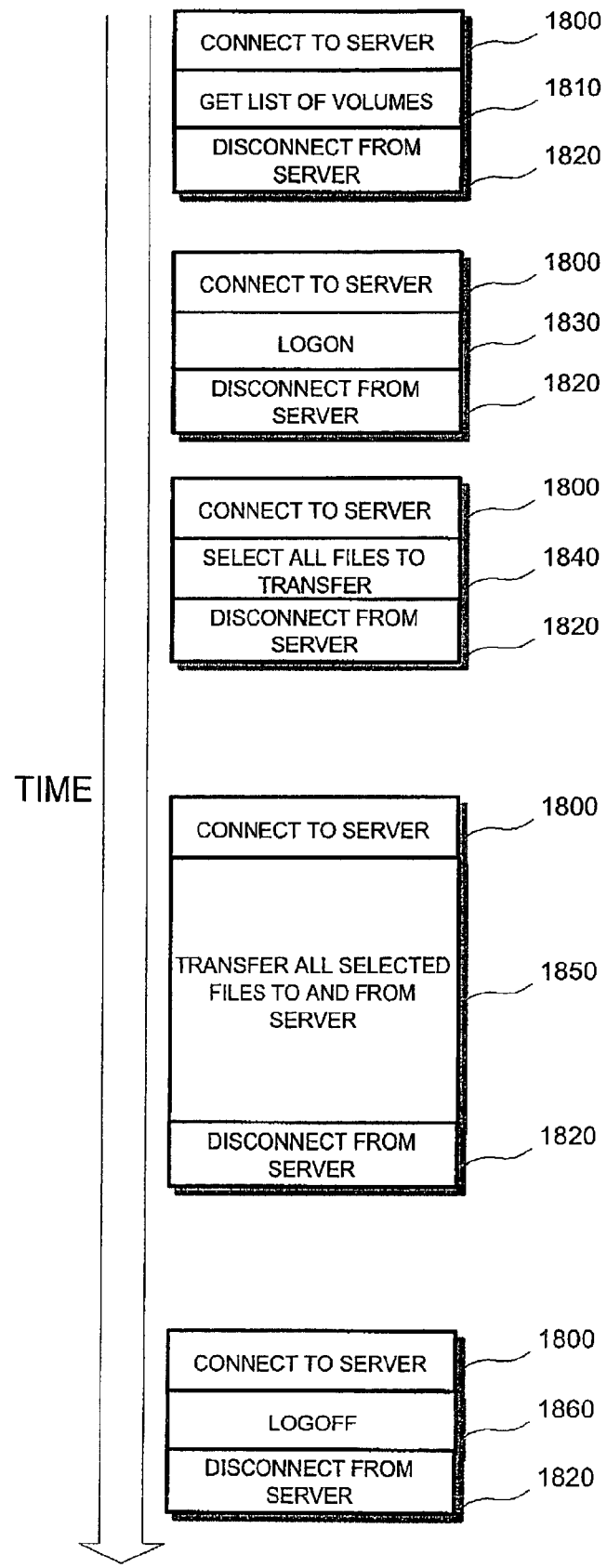
FIG. 18 is a representation of the processing timeline for the current invention.

According to one embodiment of the invention and referring to FIG. 18 the client computer program determines the set of data files that need to be transferred to and from the host, and performs the transfers using the data packaging protocol. As shown, the network connection is created (step 1800) and destroyed (1820) for each transfer, resulting in lower network utilization and fewer network resources (in the form of ports and sockets). The automatic selection of candidate data files (steps 1810 and 1840) reduces the amount of data transferred, because only the changed files are moved between the client computer program and the host. The actual data transfer occurs in a single burst (step 1850), so as to not tie up the network while the user selects each file. The limited resources of the host can thus be shared amongst multiple client computer programs, and the user of the client computer program need not keep track of which files are changed in each directory or volume in order to keep their files synchronized. On exit, the client computer program will optionally remove all user and program data, and restore system configuration settings to their original state.

Figure 19:
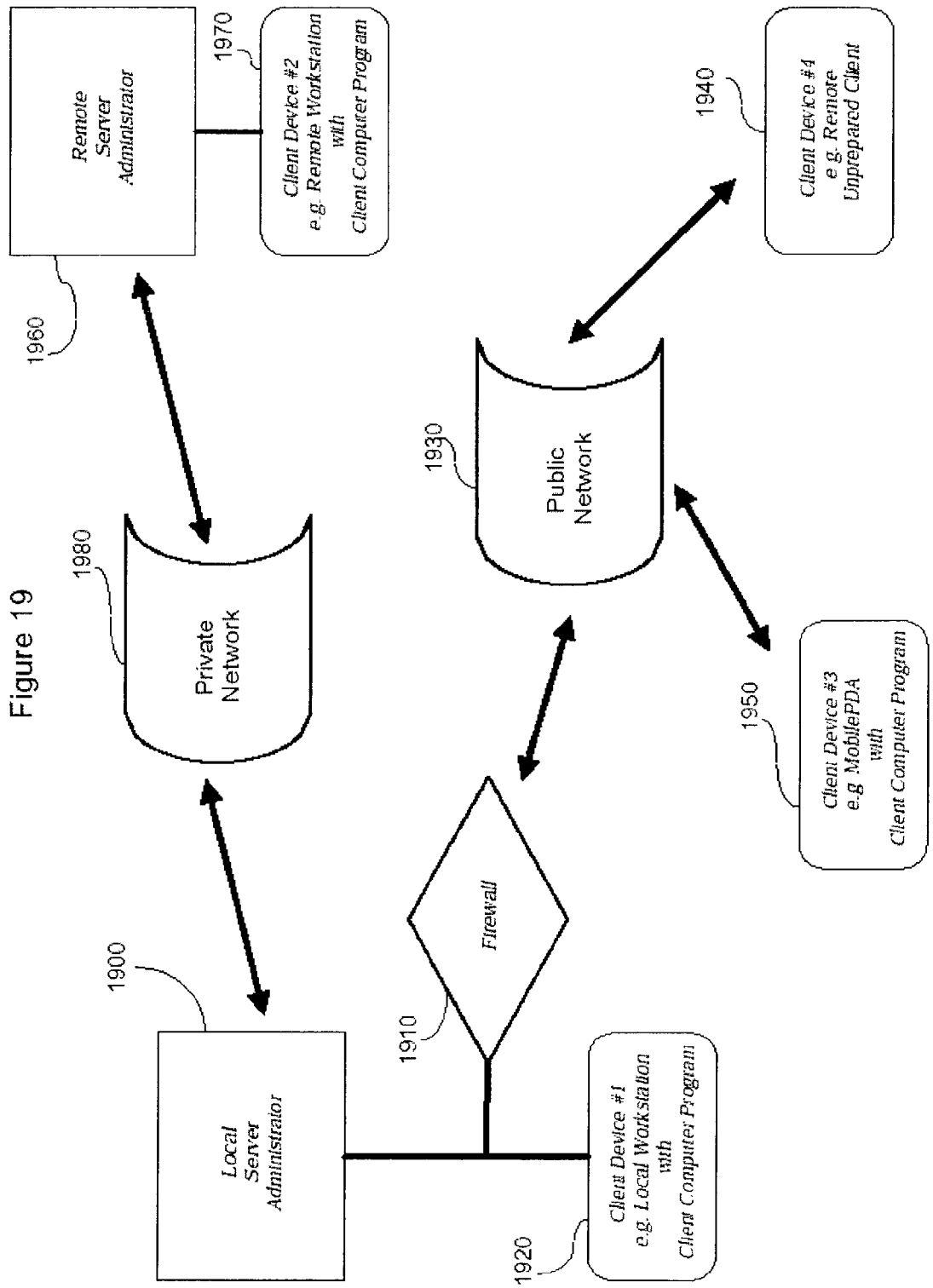
FIG. 19 is a schematic representation of a server/client computing system.

FIG. 19 illustrates a configurable client/server computing system with which the present invention may be implemented in various embodiments. According to one embodiment of the invented system the client computer program installed on client device 1920 permits the user (not shown) of device 1920 to connect to the server program installed on either (or both of) local server 1900 or (through firewall 1910) remote server 1960. If device 1920 connects to the server program directly using the LAN of which it is a portion, then it may synchronize files between itself and server 1900 for sharing with others accessing the LAN. Device 1920 may also synchronize with remote devices 1940, 1950, 1960, and 1970 by similarly, through firewall 1910, using a public network 1930 (e.g. the InterNet) or a private network 1980 (e.g. a VPN).

According to another embodiment of the invented system the client computer program installed on mobile client device 1950 (e.g. a PDA) connects to the server program installed on local server 1900 using public network 1930, or to remote server 1960 using private network 1980 permitting a user who is away from the office to synchronize various data sets between various computers thereby sharing the same or different data with various colleagues.

According to another embodiment of the invented system a remote unprepared client device 1940 connects to the server program installed on local server 1900 to download a client computer program having the capacity to "Cleanup After Exit" and self-install for providing temporary access to synchronize files on local server 1900 or remote server 1960 using either public network 1930 or private network 1980. For example, at an Internet Cafe the user may run the client computer program from a website link to access any server running the server software for which an active account was previously set up.

According to another embodiment of the invented system the client computer program installed on local server 1900 connects to the server program installed on remote server 1960 using either private network 1980 or public network 1930 and synchronizes the specified data sets between the two servers for backup or other purposes.

Advantageously, like the Internet, the present invention is not system-specific, since all data that is transferred over the Internet is transformed via the 'htonl' and 'htons' procedures to ensure byte-order neutrality, any client can talk to any server. Mystery fields, like the 'ticket', are passed from the server to the client and back without interpretation on the client. File paths are built up recursively from the parent directories, so that no assumption is made about the use of 'slash' or 'backslash' or the name of the root of the local file system (as it is '/' on Unix or Linux, 'C:' or equivalent on Windows 95, 98, NT and something else on Windows CE); long file names are permitted. Raw data files are stored on the server, which doesn't interpret the file contents. As a consequence, files can be moved between client machines and used on each machine, provided that the applications on the machines agree on the meaning of file extensions, which is usually not a problem (e.g. MS Word on the various Windows platforms makes a reasonable attempt to understand the contents of a '.doc' file). The compaction algorithm used treats data files as byte streams, as does the encryption code; and byte-order is not relevant here.

According to one embodiment of the invention the synchronizing of the files on the client and the server comprises the steps:

send Get Volumes request message from client(s) to server(s);
establish connection between said client and server;
process said Get Volumes request message;
receive server response to said Get Volumes request message;
release said connection between said client and server;
update client Volumes list;
calculate time differential between client and server;
authenticate session;
send Get Details request message from client(s) to server(s);
establish connection between said client and server;
process said Get Details request message;
receive a server response to said Get Details request message;
release said connection between said client and server;
reconcile the client and server lists of folder and file details;
mark folders and files;
establish connection between said client and server;
process all create, delete, fetch, backup and related commands;
terminate session; and
release said connection between said client and server.

The terms and expressions employed in this specification are used as terms of description and not of limitation, and there is no intention in the use of such terms and expressions to exclude any equivalents of the features shown and described or portions thereof, and it is recognized that various modifications are possible within the scope of the invention claims. Although the disclosure describes and illustrates various embodiments of the invention, it is to be understood that the invention is not limited to these particular embodiments. Many variations and modifications will now occur to those skilled in the art of network sharing, collaboration, backup and disaster recovery. For full definition of the scope of the invention, reference is to be made to the appended claims.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Ser. No. 60/338,497, filed Nov. 6, 2001, are incorporated herein by reference, in their entirety.

We claim:

1. A method for synchronizing files between a server computer having both a general purpose file system and a server synchronization application installed thereon, and at least one client computer having a client synchronization application installed thereon, wherein the client and the server have respective instances of a file which are found on the client and server respectively, the method comprising:

determining a number of attributes of at least one client-side instance of at least one file under synchronization;
   establishing an HTTP connection between the server and the client;
   resolving a number of time records between the client and the server;
   writing an attribute listing on the client, wherein the attribute listing includes at least one attribute of the at least one file under synchronization between the server and the client;
   obtaining from the general purpose file system on the server, at least one attribute of the instance of the file as found on the server, which at least one attribute corresponds to an entry included in the attribute listing on the client and the entry relates to the instance of the file as found on the client;
   comparing the attribute of the instance of the file as found on the server to the corresponding entry in the attribute listing on the client;
   determining which instance of the file has specified characteristics indicating that the instance is the desired version of the file;
   determining a set of binary differences between the instances without the use of data collected by monitoring accesses to the instances by applications on the client or the server;
   transferring the set of binary differences over the HTTP connection from the one of the server or the client computer having the instance of the file with the specified characteristics to the one of the server or client computer not having the instance of the file with specified characteristics;
   constructing the instance of the file with the specified characteristics on the one of the server or client computer to which the set of binary differences were transferred, to make the desired version of the file available for use in the format of its native application on both the client and the server; and
   updating the attribute listing on the client.

2. A method for synchronizing files between a server computer having both a general purpose file system and a server synchronization application installed thereon and a client computer, having a client synchronization application installed thereon, wherein the client stores in at least one folder under synchronization at least one instance of a file which is not found on the server, the method comprising:

determining a number of attributes of files under synchronization;
   establishing an HTTP connection between the server and the client;
   resolving a number of time records between the client and the server;
   writing an attribute listing on the client, wherein the listing includes at least one attribute of the at least one file in corresponding folders under synchronization between the server and the client;
   determining which files found on the client are not found on the general purpose file system of the server;
   transferring a binary form of each of those determined files over the HTTP connection to the server;
   constructing in a respective corresponding folder under synchronization on the server, an instance of each file the binary form of which was transferred to the server, to make the file in a folder under synchronization available for use in the format of its native application on the server; and
   updating the attribute listing on the client.

3. A method for facilitating the synchronization of files between a server computer having both a general purpose file system and a server synchronization application installed thereon, and a client computer having a client synchronization application installed thereon, wherein the server stores in at least one folder under synchronization at least one instance of a file which is not found on the client, the method comprising:

determining attributes of client-side instances of files under synchronization;
   establishing an HTTP connection between the server and the client;
   resolving a number of time records between the client and the server;
   obtaining attributes of server-side folders and files resident on the general purpose file system under synchronization;
   writing an attribute listing on the client, wherein the listing includes at least one attribute respecting every file associated with each the folder under synchronization between the server and the client;
   identifying remote files found on the server but not found on the client and transferring information representative of each the remote file to the client; and
   constructing on the client a representation of each of the remote files, whereby a user of the client is informed regarding the availability of each of the remote files for retrieval from the server.

4. The method as claimed in claim 3 further comprising:
   retrieving from the general purpose file system a binary form of at least one remote file;
   transferring the binary form from the server to the client over the HTTP connection;
   constructing an instance of the remote file on the client; and
   updating the attribute listing on the client.

5. A system for synchronizing files between a server computer and at least one client computer, wherein the client and the server have respective instances of a file which are found on the client and the server respectively, the system comprising:

a server having both a general purpose file system and a server synchronization application installed thereon;
   a client having a client synchronization application installed thereon, the client synchronization application operable to determine a timestamp or other attributes of both local files and local representations of remote files;
   means for establishing an HTTP connection between the server and the client;
   means for resolving a number of time records between the client and the server;
   means for creating an attribute listing on the client, wherein the listing includes at least one attribute respecting one of the file under synchronization between the server and the client;
   means for the client obtaining, on demand from the general purpose file system on the server, an attribute of the instance of the file as found on the server, which attribute corresponds to an entry included in the attribute listing on the client and the entry relates to the instance of the file as found on the client;

means for comparing the attribute of the instance of the file as found on the server to the corresponding entry in the attribute listing on the client;

means for determining which instance of the file has specified characteristics indicating that it is the desired version of the file;

means for determining a set of binary differences between the instances, without the use of data collected by monitoring accesses to the instances by applications on the client or the server;

means for transferring over the HTTP connection the set of binary differences, from the one of the server or the client computer having the instance of the file with the specified characteristics to the one of the server or the client computer not having that instance of the file;

means for constructing the instance of the file with the specified characteristics on the one of the server or the client computer to which the binary differences were transferred, such that the desired version of the file becomes available for use in the format of its native application on both the client and the server computers; and means for updating the attribute listing on the client computer.

6. The system as claimed in claim 5 wherein the general purpose file system is compatible with Windows, Linux, Unix, Novell, PalmOS, Symbian, z/OS, or AS/400.

7. The system as claimed in claim 5 wherein the attribute listing is a file on the client to store information about the most recent operations on the file.

8. The system as claimed in claim 5 wherein the attribute listing is an unencrypted file stored in a serialized binary format.

9. The system as claimed in claim 5 wherein the compared attribute is a checksum.

10. The system as claimed in claim 5 wherein the attribute listing includes at least one attribute selected from the group consisting of: Folder index, File name length, File name, Path length, Actual path, Last Write time, Last Access time, Last Backup time, and Flag status.

11. The system as claimed in claim 5 wherein the means for transferring any binary differences comprises the public rsync utility for fast incremental file transfer.

12. The system as claimed in claim 5 further comprising means for encrypting and decrypting the binary differences during transmission between the server and the client.

13. The system as claimed in claim 5 further comprising means for compressing and decompressing.

14. The system as claimed in claim 5 further comprising means for hashing.

15. The system as claimed in claim 5 further comprising means for sharing.

16. The system as claimed in claim 5 wherein the information about folders is selected from the group consisting of Folder Name, Folder Index, Parent Folder Index, Path, and Flags.

* * * * *